US006983186B2

(12) United States Patent
Navani et al.

(10) Patent No.: US 6,983,186 B2
(45) Date of Patent: Jan. 3, 2006

(54) COMPUTER METHOD AND APPARATUS FOR VESSEL SELECTION AND OPTIMIZATION

(75) Inventors: Girish Navani, Shrewsbury, MA (US); Barry H. Cohn, Sugar Land, TX (US); Michael P. Evans, Cambridge, MA (US); Donald A. Dietrich, Wenham, MA (US); Michael D. Allen, Houston, TX (US); Charles C. Moore, Hopkinton, MA (US); Linus Hakimattar, Southborough, MA (US); Stephen J. Doyle, Southborough, MA (US); Wayne C. Bartel, Houston, TX (US); Nigel Johnson, Duxbury, MA (US); Khaled Zayadine, Farnborough (GB); Ken Rosen, Andover, MA (US); Vladimir Mahalec, Sudbury, MA (US)

(73) Assignee: Aspen Technology, Inc., Cambridge, MA (US)

( * ) Notice: Subject to any disclaimer, the term of this patent is extended or adjusted under 35 U.S.C. 154(b) by 409 days.

(21) Appl. No.: 09/949,163

(22) Filed: Sep. 7, 2001

(65) Prior Publication Data

US 2002/0069210 A1 Jun. 6, 2002

Related U.S. Application Data

(60) Provisional application No. 60/230,840, filed on Sep. 7, 2000.

(51) Int. Cl.
*G06F 19/00* (2006.01)
(52) U.S. Cl. .......................... 700/95; 700/29
(58) Field of Classification Search ............... 364/402, 364/401, 468, 403, 478, 14 P; 705/37, 29, 705/10, 28; 700/95
See application file for complete search history.

(56) References Cited

U.S. PATENT DOCUMENTS

| 5,450,317 A | * | 9/1995 | Lu et al. ........................ 705/10 |
| 5,467,285 A | * | 11/1995 | Flinn et al. ................... 700/95 |
| 5,835,716 A | | 11/1998 | Hunt et al. |
| 6,035,289 A | | 3/2000 | Chou et al. |
| 2002/0049660 A1 | * | 4/2002 | Obrador et al. ................ 705/37 |

FOREIGN PATENT DOCUMENTS

WO  WO 00/48054  8/2000

OTHER PUBLICATIONS

Non- provisional U.S. Appl. No. 60/181,451, filed Feb. 10, 2000.*

(Continued)

*Primary Examiner*—Charles Rones
*Assistant Examiner*—Belix M. Ortiz
(74) *Attorney, Agent, or Firm*—Hamilton, Brook, Smith & Reynolds, P.C.

(57) ABSTRACT

Currently lacking are effective and accurate tools to help petroleum traders and logistics personnel to make better decisions, collaborate in real-time and negotiate deals in a private and secure environment. The present invention addresses this and other needs in the industry.

In particular, the present invention provides a non-client computer resident method optimizes vessel scheduling by aggregating vessel information. At least some of the vessel information is automatically downloaded from an electronic source. The aggregated vessel information is stored in a vessel information database comprising vessel information database records. Information is obtained about a potential vessel contracting transaction. The vessel information database is searched in a real-time manner to match the potential vessel contracting transaction to at least one of the vessel information database records such that the vessel contracting transaction is optimized. At least one of the optimized vessel contracting transactions is then reported. Optimization factors used to produce the optimized vessel contracting transactions include lowest cost and fastest delivery.

13 Claims, 21 Drawing Sheets

OTHER PUBLICATIONS

RedMeteor, Energy Commodity Markets [retrieved on Sep. 10, 2001]. Retrieved from the Internet, URL:http://www.redmeteor.com/redmeteor/gen_info/emarket.asp.

RedMeteor, Digital Exchange Marketplace [retrieved on Sep. 10, 2001]. Retrieved from the Internet, URL:http://www.redmeteor.com/redmeteor/gen_info/digexchange.asp.

RedMeteor, Platform Packages [retrieved on Sep. 10, 2001]. Retrieved from the Internet, URL:http://redmeteor.com/redmeteor/gen_info/products.asp.

RedMeteor, For More Information About Us, Please Contact [retrieved on Sep. 10, 2001]. Retrieved from the Internet, URL:http://www.redmeteor.com/redmeteor/gen_info/contact.asp.

Process Industry Modeling System Training Manual, Part 1 (Aspen Technology, Inc.), Jun. 1, 1998.

Process Industry Modeling System, Training Manual, Part 2 (Aspen Technology, Inc.), Jun. 1, 1998.

EnronOnline, About EnronOnline [retrieved on Sep. 10, 2001]. Retrieved from the Internet, URL:http://www.enrononline.com/docs/marketing/AboutEnronOnline.

EnronOnline, Transacting Online [retrieved on Sep. 10, 2001]. Retrieved from the Internet, URL:http://www.enrononline.com/docs/marketing/AboutEnronOnline/Transacting Online.

HoustonStreet, Inc., Our Vision [retrieved on Sep. 10, 2001]. Retrieved from the Internet, URL:http://www.houstonstreet.com/htdocs/us/about/OurVision.asp.

HoustonStreet, Inc., HoustonStreet Solutions [retrieved on Sep. 10, 2001]. Retrieved from the Internet, URL:http://www.houstonstreet.com/htdocs/us/Deal/solgroup.asp.

HoustonStreet, Inc., Together . . . Becoming How Energy Companies Do Business (A) Retrieved from the Internet, URL:http://www.houstonstreet.com/htdocs/us/deal/dealcapture.asp.

HoustonStreet, Inc., Together . . . Becoming How Energy Companies Do Business (B) Retrieved from the Internet, URL:http://www.houstonstreet.com/htdocs/us/deal/dealcapturepro.asp.

HoustonStreet, Inc., Together . . . Becoming How Energy Companies Do Business (C) Retrieved from the Internet, URL:http://www.houstonstreet.com/htdocs/us/deal/extoex.asp.

HoustonStreet, Inc., Together . . . Becoming How Energy Companies Do Business (D) Retrieved from the Internet, URL:http://www.houstonstreet.com/htdocs/us/deal/pricenet.asp.

RedMeteor, Introduction [retrieved on Sep. 10, 2001]. Retrieved from the Internet, URL:http://www.redmeteor.com/redmeteor/gen_info/intro.asp.

RedMeteor, The Company Retrieved from the Internet, URL:http://www.redmeteor.com/redmeteor/gen_info/company.asp.

* cited by examiner

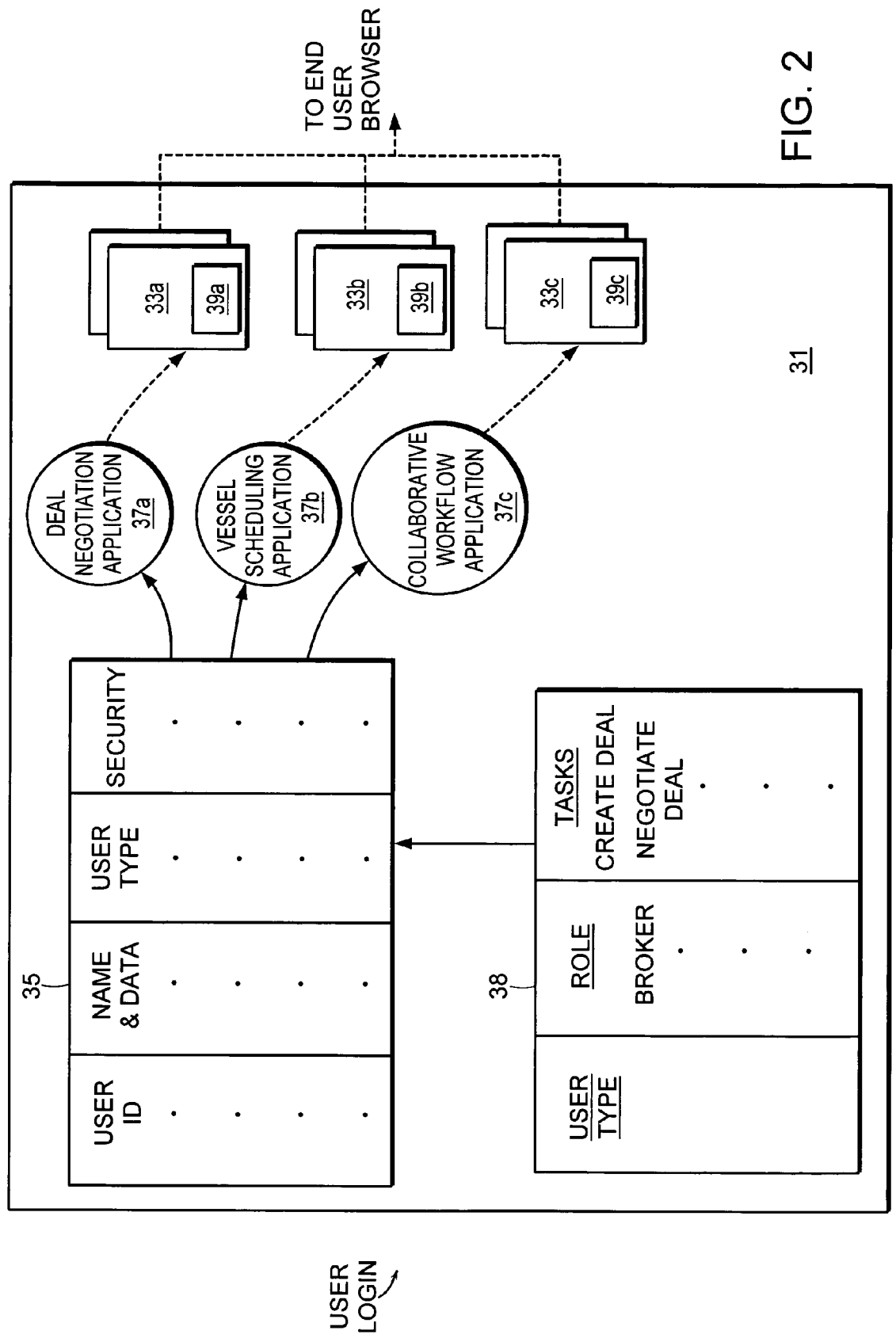

FIG. 3A

| | | | | Market | | | | Bids | | | Offers | | |
|---|---|---|---|---|---|---|---|---|---|---|---|---|---|
| Counter Parts | Deal Type | Grade | Location | Deliver Terms | Delivery Period | Pricing Book | S | Volume | Uom | Bid | Offer | Volume | Uom |
| ALPHA | BAS | Jacks | HOUSTON | FOB | 01Jun-10Jun | NYMEX | | | | | 12.90 | 10.409 | Bbl |
| EPSILON | BAS | WTI | Ginah Tex | FOB | 01Jun-10Jun | NYMEX | | 30,000 | Bbl | 29.50 | | | |
| EPSILON | BAS | WTI | Ginah Tex | FOB | 01Jun-10Jun | NYMEX | | | | | 20.50 | 10.409 | Bbl |
| EPSILON | BAS | WTI | Ginah Tex | FOB | 01Jun-10Jun | NYMEX | | | | | 20.50 | 10.409 | Bbl |

Trade Floor
US Crudes | International Crudes | US Products | International Products | Intermediates | What's New Tips [] View | All Active | All | Grades All

| View | 40 |
|---|---|
| Hold | 44 |
| Resume | 46 |
| Cancel | 48 |
| Negotiate | 50 |
| Div. Trm. Dtls | 52 |
| Add to DSTs | 54 |

Create | Legend | Hold All | Resume All | Cancel All

Main Trade Floor Panel

FIG. 3B

Alpha Company , Trader
Effective as of 6/20/2001 at 1:5:35
Offer Type: ○Bid ⦿Offer  ⦿Private ○Public
Campaign  74 Grade dld Boston

1. Select a Market

TradeFloor  US PRDCT  Select Market
Grade:  CPL 74 Grade LSD  Specification Override
Mkt. Location:  Boston
Delivery:  DLVD ▷
Deal Type:  BAS ▷
Delivery From: 7/1/2001  To: 7/30/2001

Deal Type : Basis

Exchange  Contract Month
NYMEX ▷  Jul 2001 ▷

2. Invite To Trade

PetroVantage Addresses ▷
▷

ParthaSarathy Subramania
vijay kumar
Trader D
Trader C
Trader B
Petro Vantage

Add
Remove

Trader B

3. Post and Notify

| Counter Party | Quantity | UOM | Price | PricingWindow | Expires After | |
|---|---|---|---|---|---|---|
| Beta Company, Trader B | 100000 | Bbl ▷ | 0.0300 | Not Applicable ▷ | 3 Hr(s) | 0 Min(s) |

Post

Add a Trade Panel

~57

Alpha Company, Trader A
Trader, #41
Navagate Status: Active

Market: | Base Trade | NYMEX |
| A2 BFD 87 | PRDCT |
| Delivered | 7/1/2001 |

Beta Company Ⓐ

Seller - Trader A
| CO | Pricing Base | Offer | Quantity | Pricing Window | Expires After | |
|----|--------------|-------|----------|----------------|---------------|---|
| A2 | NYMEX Jul 2001 | .0850 | 225020 | EPP | ☐ Hr(s). ☐ 10 Min(s). ⓘ | Print |

Buyer - Trader B
| CO | Pricing Base | Bid | Quantity | Pricing Window | Expires After | |
|----|--------------|-----|----------|----------------|---------------|---|
| A2 | NYMEX Jul 2001 | 0.085 | 225020 | EPP | Never Expires | Close |

Trader
Trader B

PV Pilot
(15 Jun 2001 9:34 AM)
Use the "Negotiate" button to add notes.

Trader B
(15 Jun 2001 9:52 AM)
Trader A, I am interested in your offer and bid .0925 per bbl.

Trader A
(15 Jun 2001 10:06 AM)
Trader B, I will offer you .0950 per bbl, but the offer is good for 10 minutes only.

◁ ▷

[ Negotiate ]   ☐ Trigger Alert

Invite Additional Traders

[ Summary ]   [ Close ]

Example Negotiate Panel  ~59

Jim Planner: Home Layout

Close Deal Pre Deal Refinery Upset Ship Upset

CWE VIEW

Primary Filter: [All ▽]   Value: [All ▽] [Go]

| | Title | Status | Requester | Respondent | Start Date/Trigger | End Date/Trigger |
|---|---|---|---|---|---|---|
| ⊞ | Ship Late 06-June-2001 | ◇ | | | 19 Jun 2001 | 19 Jun 2001 |
| ⊞ | Closed Deal Notification - All 14-06-2001 | ☐ | | | 19 Jun 2001 | 19 Jun 2001 |
| ⊞ | Pre Deal Items 16-June-2001 | ☐ | | | 19 Jun 2001 | -No Date- |
| ⊞ | Closed Deal Tracking-All 14-June-2001 | | | | | |

Home Layout ▽

CONFIG

| | | | | | |
|---|---|---|---|---|---|
| ⊟ | Closed Deal Notification - All 14-06-2001 | ◇ | | | 19 Jun 2001 | 19 Jun 2001 |
| ⊟ | ...Notification To Primary Party By System | ◇ | | | 19 Jun 2001 | 19 Jun 2001 |
| | ...Notify Internal Trader Team —252 | ◇ | Sam CrudeManager | Girish IntContAdmin | 0d 0h 0m after 'Closed Deal Notification - All 14-06-2001' Status is active (19 Jun 2001) | 0d 0h 0m after 'Notify Internal Trader Team' Status is active (19 Jun 2001) |
| | ...Notify Mid-Office System —254 | ◇ | Sam CrudeManager | Jane Trader | 0d 0h 0m after 'Closed Deal Notification - All 14-06-2001' Status is active (19 Jun 2001) | 0d 0h 0m after 'Notify Mid-Office System' Status is active (19 Jun 2001) |

General

Activity Name: Intitial Load Port Inspection
Activity Type: simple request with response
Status: Not Started
Form: LV
Input:
Request: Get Initial Load Port Inspection done with respect to a deal having the following terms; Operational Terms, Non-Commercial Terms.
Input Data:
Start Trigger/Date: starts on 1 Jul 2001
Due Date: on-demand
Completed: -NoDate-

Relationships

| Relationship | Person |
|---|---|
| RESPONDED-TO-BY | Jane Trader |
| INITIATED-BY | Sam CrudeManager |

Documents

[ Close ]

PetroVantage
Evaluate, Collaborate, Negotiate

CBAT-G v0.9

Load    Save    Help

Blend Specification

CARB 87 Averaging
CARB 87 Flat Limit
CARB 93 Averaging
CARB 93 Flat Limit phase down rig
sean m4
seans m4

290 →

| Blend Specification | Price ($/bbl) | Min Qty (000's bbl) | Max Qty (000's bbl) | Optional |
|---|---|---|---|---|
| Rfg Unl Regular | 38.64 | 1 | 11 | ☐ |
| Rfg Unl Midgrade | 36.9 | 1 | 5 | ☐ |
| Rfg Unl Premium | 42.0 | 1 | 8 | ☐ |
| Total: | | 8 | 106 | |

Add

Trade Floor Components

292 →

| Gasoline Component | Location | Available Vol (bbl) | Delivery in tank | In Use | Price ($/bbl) | Delivered Price ($/bbl) | Min Qty (000's bbl) | Max Qty (000's bbl) | Optional |
|---|---|---|---|---|---|---|---|---|---|
| Normal Butane | BS | | August 28 | BS | 0.0 | 0.0 | 0 | 100 | ☐ |
| U. S. Run Gasoline | BS | | August 28 | BS | 5.46 | 5.46 | 6,300 | 100 | ☐ |
| U Hydrocrackate | BS | | August 28 | BS | 7.56 | 7.56 | 3.5 | 100 | ☐ |
| Reformate | BS | | August 28 | BS | 11.34 | 11.34 | 28 | 400 | ☐ |
| | | | | | Total: | | 37.800 | | |

Add  Load  Save

In Stock or On Hand Components

294 →

| Gasoline Component | Location | Available Vol (bbl) | Delivery in tank | In Use | Price ($/bbl) | Min Qty (000's bbl) | Max Qty (000's bbl) | Optional |
|---|---|---|---|---|---|---|---|---|
| FCC Gasoline | | | August 28 | BS | 9.66 | 23 | 100 | ☐ |
| Alkylate | | | August 28 | BS | 11.34 | 10 | 100 | ☐ |
| MTBE | | | August 28 | BS | 15.54 | 0 | 300 | ☐ |

Evaluate    Total: 296

FIG. 13B

Blend Results - Microsoft Internet Explorer

PetroVantage
Evaluate, Collaborate, Negotiate

Save    Help

CBAT-G v0.9

Lower bound Total Hydrocarbon Reduction contraint on the product Rfg Unl Regular has not been met.
Lower bound Total Hydrocarbon Recuction contraint on the product Rfg Unl Midgrade has not been met
Lower bound Total Hydrocarbon Reduction contraint on the product Rfg Unl Premium has not been met.

Resultant Product Blends — 300

| Blend Specification | Vol. (000's bbl) | Price ($/bbl) | Value (000's $) |
|---|---|---|---|
| Rfg Unl Regular | 11 | 38.64 | 425.04 |
| Rfg Unl Midgrade | 5 | 36.90 | 184.500 |
| Rfg Unl Premium | 8 | 42 | 336 |
| Totals: | 109 | 38.15 | 4158.54 |

Trade Floor Components — 302

| Gasoline Component | Location | Vol. (000's bbl) | Delivered Cost ($/bbl) | Cost (000's $) |
|---|---|---|---|---|
| Normal Butane | BS | 0.834 | 0 | 0 |
| Lt St Run Gasoline | BS | 29.948 | 5.45 | 163.518 |
| Lt Hydrocractate | BS | 3.5 | 7.58 | 26.46 |
| Reformate | BS | 28 | 11.34 | 317.520 |
| Totals: | | 62.28 | 8.15 | 507.5 |

In Stock or On Hand Components — 304

| Gasoline Component | Used (000's bbl) | Remaining (000's bbl) | Price ($) | Cost (000's $) |
|---|---|---|---|---|
| FCC Gasoline | 23 | | 9.66 | 222.18 |
| Alkylate | 11.61 | | 11.34 | 133.924 |
| MTBE | 11.908 | | 15.54 | 185.044 |
| Totals: | 46.72 | | 11.59 | 541.15 |

Make Deal ☐☐☐☐ — 306

Remove From Available Stock ☐☐☐ — 308

COMPUTER METHOD AND APPARATUS FOR VESSEL SELECTION AND OPTIMIZATION

RELATED APPLICATION

This application claims the benefit of U.S. Provisional Application No. 60/230,840 filed on Sep. 7, 2000, the entire teachings of which are incorporated herein by reference.

This application is related to United States Patent Application titled: COMPUTER METHOD AND APPARATUS FOR PETROLEUM TRADING AND LOGISTICS by Girish Navani, James Harrison Stommel, Barry H. Cohn, Michael P. Evans, Donald A. Dietrich, Bruce A. Logan, Michael D. Allen, Charles C. Moore, Linus Hakimattar, Stephen J. Doyle, Wayne C. Bartel, Scott Folger, Nigel Johnson, Nigel Kidd, Khaled Zayadine, Vip Patel, Ken Rosen, Sean Collins and Vlad Mahalec and United States Patent Application titled: COMPUTER SYSTEM FOR PROVIDING A COLLABORATIVE WORKFLOW ENVIRONMENT by Girish Navani, Michael P. Evans, Donald A. Dietrich, Michael D. Allen, Charles C. Moore, Linus Hakimattar, Stephen J. Doyle, Wayne C. Bartel, Kevin Maher, Vip Patel, Ken Rosen and Vlad Mahalec all related applications filed on even date herewith and commonly owned by the owner of this application.

BACKGROUND OF THE INVENTION

Generally speaking, the petroleum industry involves three major players—(1) oil refineries, (2) crude oil and refined products traders/brokers and (3) service providers such as vessel owners/brokers, inspectors, terminal operators and pipeline companies. Each party typically uses internal procedures and proprietary means to conduct business/trading. Crude oil and petroleum product trading is not standardized, there are over 600 types of crude oil around the world.

Briefly, the oil refineries receive crude oil and process the oil into usable products and/or blendable components such as fuel oil, intermediate feedstocks and high grade gasoline. The refinery receives orders for various quantities of products specified by respective grade and quality. Also, the refinery schedules specific dates by which to fulfill the orders.

An analyst of the refinery uses internal and/or published standards to determine the necessary ingredients and quantities thereof to blend together to form an ordered product to specification. Next, he checks the refinery's inventory for availability of these ingredients in the desired quantities. He may find some ingredients, at the desired quantities, to be in inventory while other ingredients need to be obtained. The analyst cross references the ingredients of his order with that of other orders to account for any inventory which may be in common with the order he is processing. Thus it is a complex exercise to determine which ingredients and at what quantities are needed to be added to the inventory in order to fulfill each product order.

Further, a product marketer forecasts demand of products. A refinery planner evaluates refinery operation, output and available resources, and monitors/maintains appropriate inventory. Inventory may include (i) various crude oils, (ii) intermediate feedstocks usable for component blending and (iii) end products. The refinery planner wants to optimize the plant (refinery) and thus needs to determine what crude oils are going to give the best yield given the current plant configuration (distillation columns, catalyst crackers, etc.).

The supply trader or an outside broker has the task of obtaining the needed feedstock at the necessary quantities for inventory. For each needed feedstock, the supply trader has a target receipt date and a total dollar budget which is acceptable to the refinery (in order to economically and timely fill product orders). The supply trader contacts his network of suppliers for respective quotes (going rates) on available quantities of the needed feedstock. Typically, rates change daily or within a day. Sometimes the supply trader will look to purchasing piecewise quantities from plural suppliers which in the aggregate meets the total needed amount of a feedstock within the acceptable budget. Variation in quality, and the like, affect the quantities and the price that the trader will pay for a given feedstock. Also the trader needs to work with scheduling personnel to arrange for shipping of the quantities of the feedstock, from the various sources, so that the total needed amount arrives at the refinery by an acceptable date (the target receipt date).

As can be seen given the foregoing, the trader must make multiple phone calls to his suppliers and shippers and maintain a complex tally of costs, quantities and time schedules in order to accomplish his task. That is, by the time the trader makes a series of phone calls, e.g. to a first supplier, a second supplier, a shipper and then re-calls the first supplier, the unit price may have changed or the shipping vessel is no longer available. Consequently the trader must make adjustments, more phone calls and recalculate totals to ensure he is within budget/target (dollar and timewise).

Further there is a dynamic aspect of crude oil and petroleum product trading. In transit amounts of crude oil (or intermediate feedstock/components) may become available to the market where that amount is arriving too late to fulfill an original order. Various amounts of crude oil, intermediate feedstocks (components) or end products may become available in a disaster recovery situation. Traders/brokers use these offers and the results thereof in fulfilling (in full or part) original orders.

Further, there are various distribution points for petroleum products (e.g., gasoline) throughout the United States. Different distribution points carry different grades of products as a function of local and state regulations. The U.S. Department of Energy controls amounts in inventory at each of the distribution points. The federal agency determines what amounts of which products need to be shifted among the distribution points based on monthly to quarterly reports by the distribution points. Accordingly, the petroleum industry supply chain is illustrated in FIG. 5 and discussed later.

SUMMARY OF THE INVENTION

Currently lacking are automated means for effecting real-time crude oil and petroleum product trading, refining and logistics support. The present invention addresses this and other needs in the industry.

In particular, the present invention provides a non-client computer resident method for optimizing vessel scheduling by aggregating vessel information. At least some of the vessel information is automatically downloaded from an electronic source. The aggregated vessel information is stored in a vessel information database comprising vessel information database records. Information is obtained about a potential vessel contracting transaction. The vessel information database is searched in a real-time manner to match the potential vessel contracting transaction to at least one of the vessel information database records such that the vessel contracting transaction is optimized. At least one of the optimized vessel contracting transactions is then reported. Optimization factors used to produce the optimized vessel contracting transactions include lowest cost and fastest delivery.

The vessel information comprises at least one of: vessel availability, physical vessel specifications, standard port-to-port pricing, physical port specifications and vessel vetting information.

In one preferred embodiment, optimized vessel scheduling is provided as part of an overall transportation search and optimization system.

Benefits of the present invention include more accurate data and fewer typographical errors. Efficiency is improved as lag-time is squeezed out of supply chain operations. The graphical user interface is easier to use than conventional methods of vessel scheduling and consolidates the interface to aggregated vessel data. Real-time access to server-based vessel scheduling applications provides optimized results faster.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a block diagram of the preferred embodiment of the invention.

FIG. 3a is an illustration of a deal negotiation system main screen of the present invention in the embodiment of FIG. 2.

FIGS. 3b and 3c are illustrations of working screen views of respective operations in the deal negotiation system main screen of FIG. 3a.

FIG. 11a illustrates a collaborative workflow environment view of collaborative workflow processes.

FIG. 11b illustrates a view of business processes associated with a specific collaborative workflow process.

FIG. 11c illustrates a view of an activity associated with a specific business process.

FIG. 12 is an illustration of a graphical user interface for vessel searching and optimization configured according to an embodiment of the present invention.

FIG. 13a illustrates the CBAT-G tool being used to evaluate components for blending.

FIG. 13b illustrates the CBAT-G tool being used to integrate to decision support tools providing vessel scheduling and optimization services for components and blends.

DETAILED DESCRIPTION OF THE INVENTION

Figure 1:
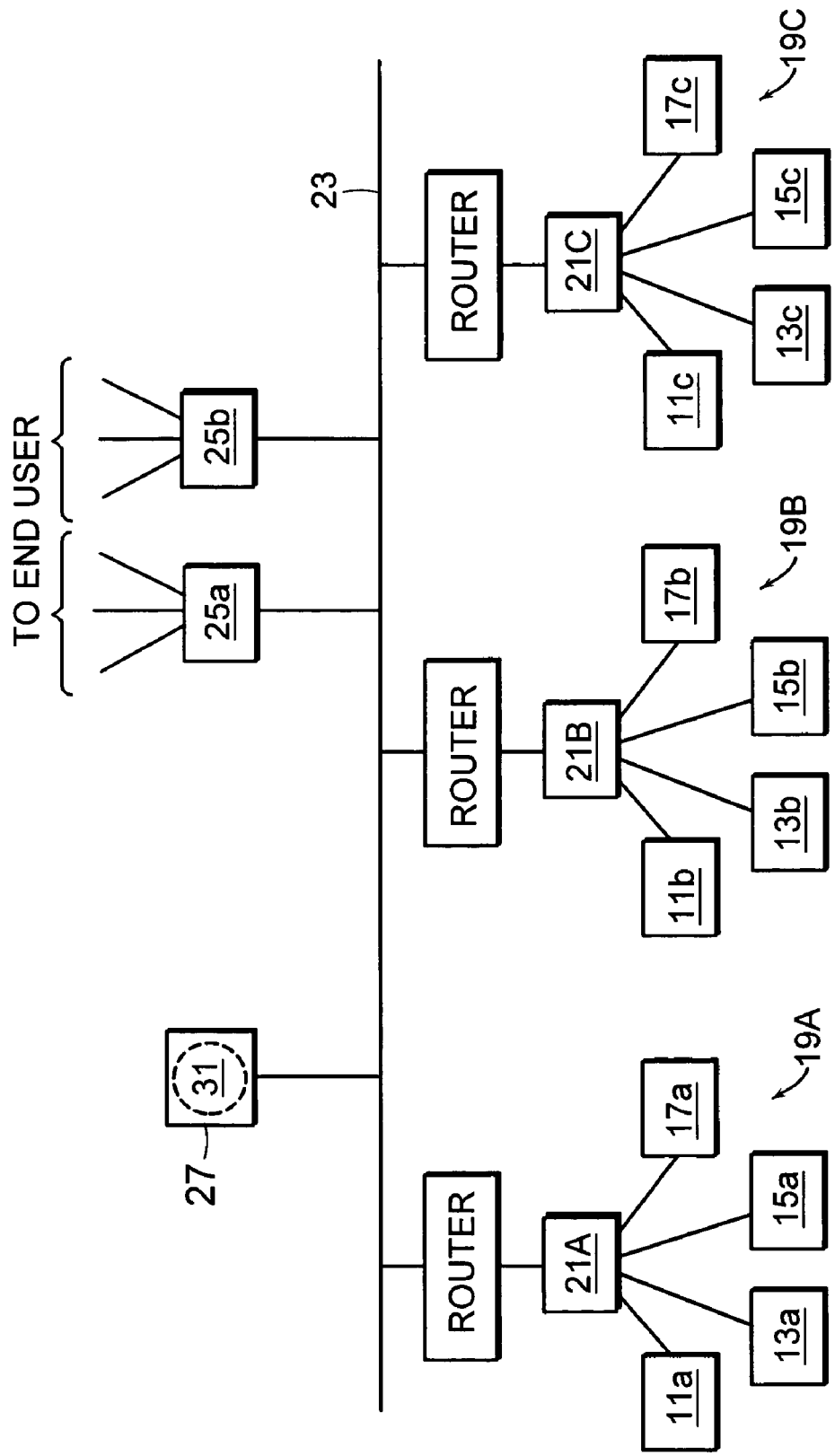
FIG. 1 is a schematic overview of a computer network in which the present invention is operated.

Illustrated in FIG. 1 is a plurality of networks 19a, 19b, 19c. Each network 19 includes a multiplicity of digital processors 11, 13, 15, 17 (e.g., PC's, mini computer and the like) loosely coupled to a host processor or server 21a, 21b, 21c for communication among the processors within that network 19. Also included in each network 19 are printers, facsimiles and the like. In turn, each host processor 21 is coupled to a communication line 23 which interconnects or links the networks 19a, 19b, 19c to each other to form an internet. That is, each of the networks 19 are themselves loosely coupled along a communication line 23 to enable access from a digital processor 11, 13, 15, 17 of one network 19 to a digital processor 11, 13, 15, 17 of another network 19. In the preferred embodiment, the loose coupling of networks 19 is a global computer network, such as the Internet.

Also linked to communication line 23 are various servers 25a, 25b which provide to end users access to the Internet (i.e., access to potentially all other networks 19, and hence processors 11, 13, 15, 17 connected to the Internet). The present invention is a software program 31 operated and connected through a server 27 to the Internet for communication among the various networks 19 and/or processors 11, 13, 15, 17 and other end user connected through respective servers 25. In the preferred embodiment, the server 27 is, for example, Sun Microsystems UltraSparc (e.g., Enterprise series), or a multiplicity of similar such servers running HyperText Transfer protocol (HTTP) server software to support operation of present invention program 31.

Upon an end user logging onto program 31 through a common Internet protocol, program 31 generates an initial screen view and displays the same to the end user. Depending on the unique user ID that the end user enters during user logon, a different initial screen, view and subsequent series of screens, per user, are displayed. The unique user ID is preferably assigned to the user during a registration process prior to use of the program 31. Through the registration process the type of user (plant manager, analyst, oil trading broker, . . . etc.), security level or access (read, write, modify) privileges and other determinations about the user are made. Based on these determinations, the features and tools of program 31 most usable and pertinent to the particular user are tagged/flagged and linked to the user's unique user ID. Upon a login bearing the unique user ID, the program 31 formulates an appropriate initial screen view for the corresponding user. The preferred embodiment is a role-based system defined by user type.

Referring to FIG. 2, a table, set of pointers, or other means 35 are employed to cross reference unique user ID to user type, security/access level, and/or features and tools of program 31. Various data structures and constructs are suitable and are in the purview of one skilled in the art. In the preferred embodiment, user type (in user ID table 35) is defined in a role-based definitions table 38. Definitions table 38 is indexed by user type, and for each user type, definitions table 38 specifies a corresponding business or industry role and respective tasks of that role. Thus, for example, a user type "B" may be defined in table 38 to correspond to the role of "Broker", and definitions table 38 specifies the corresponding tasks of creating deals, negotiating deals, closing deals, etc., for that user type and role.

The possible tools, links, subsequent screens and other information that an initial screen view may have are discussed next. It is understood that various combinations of the following are employed for various end users depending on the use determinations made at the registration stage and tied (through tables 35 and 38) to the unique user ID per user.

Continuing with FIG. 2, program 31 is formed of an assembly of user-interactive applications programs 37 (namely, the deal negotiation system 37a, the scheduling application 37b and collaborative workflow application 37c), corresponding screen views 33 and user interface. As mentioned above, depending on user ID (and hence user types), the different application programs 37 provide different support tools 39 and screen views 33 for use by the end user during execution of the respective application program 37.

For example, the deal negotiation system 37a provides a main screen view 41 as illustrated in FIG. 3a. The deal negotiation system main screen 41 enables end users to create, view, discuss, negotiate and close a trade (i.e., define and complete a transaction) for a desired quantity and grade of crude oil, intermediate feedstock or petroleum product. To that end, the deal negotiation system main screen 41 and series of subscreens (from tabs) and windows (from drop down, pop-up or cascading menus) provide an online trading process that allows end users to buy or sell crude oil and petroleum products online and to handle other necessary operations related to petroleum trading. As such, the deal negotiation application 37a allows end users to conduct trading in a private and/or public marketplace in a secure-data, real-time environment.

In the preferred embodiment, the deal negotiation system main screen 41 displays information about bids and offers (of an end user) according to markets in which they are currently posted. That is, the "U.S. Crudes" tab (subscreen view) 43a displays the end user's current trade deals involving U.S. crude oil. The "International Crudes" tab (subscreen view) 43b displays the end user's current trade deals involving international crude oil. The "U.S. Products" tab (subscreen view) 43c displays the end user's current U.S. petroleum products trade deals. The "International Products" tab (subscreen view) 43d displays the end user's current international petroleum product trade deals. The "Intermediates" tab (subscreen view) 43e displays the end user's current intermediates feedstock trade deals. The "What's New" tab (subscreen view) 43f displays trades on which the end user has not yet acted.

For each posted trade deal 45 of a given tab 43 (subscreen view), the deal negotiation application 37a displays:

(i) Name (abbreviated or the like) of the counter party making or receiving a bid or offer, (ii) type of trade (e.g., basis trade, index trade, fixed and flat trade or buy and sell trade), (iii) grade of petroleum being traded, (iv) geographic location where the crude oil, intermediate feedstock or petroleum product is being loaded or delivered, (v) delivery terms and time period/date range (e.g., free on board (FOB); cost, insurance and freight (CIF); cost and freight (C&F); delivered (DLVD); delivered exship (DES); delivered duty paid (DDP); delivered duty unpaid (DDU)), (vi) pricing basis used to determine final price of the closed deal, and (vii) bid or offer information 55. (to be associated to the pricing basis (above)

Bid and offer information 55 includes:

(i) status of a bid/offer (e.g., new/not yet acted on by recipient, active trade/can be negotiated and closed, inactive trade/closed by other trading party, expired trade/no longer available for negotiating, on hold/temporarily unavailable for negotiating or acceptance). Symbols, icons or other indicators may be employed to indicate each different status;

(ii) quantity being traded;

(iii) quantity unit of measure for the posted material; and (iv) bid/offer amount that is over or under market or index price. A bid or offer amount may alternatively be indicated as a flat amount instead of as a differential.

For filtered views of the foregoing trade data, the deal negotiation system 37a provides Tips check box 47, first view list 49, second view list 51 and grades 53 features. Tip check box 47 enables the "mouse-over display of bid and offer information 55 in expanded or spelled-out fashion instead of abbreviations and symbols, when the cursor is moved across (hovers over) the posted trades (deals) 45. The first view list 49 controls the types of trade deals displayed. In the preferred embodiment, the types of trade deals that can be selected are: public, private and all active. The second view list 51 further filters the types of trade deals of the first view list 49 between all and self-posted trades 45. The grades feature 53 controls display of posted trades 45 based on user-selected grade of petroleum.

The deal negotiation system 37a also provides various operations on trades (deals) 45, individually or as a group (e.g., in a common market, tab/subscreen 43). The operations are implemented through pop up menus, pull down menus, icons, buttons or other working areas in the screen views. In the preferred embodiment, the operations include "view", "create", "hold", "resume", "cancel", "negotiate", "delivery term details" and "add to decision support tools", each described next.

The "view" operation 40 (FIG. 3a) displays details of a user-selected offer or bid of a posted trade (deal) 45 displayed in the deal negotiation system main screen 41 or subscreens 43. The displayed detailed information about the selected trade includes the trade type, the trade commodity details, market and pricing details, quantity and trader information.

The "create" operation 42 displays a working area in which to add a trade deal 45, i.e. allows the end user to create an offer or bid in a desired marketplace. Inviting selected individuals from a deal negotiation system suppliers address book and/or private address book and buddy list. Creating an offer is a seller's function that allows the seller to place the commodity on the deal negotiation system main screen 41 to one or more invited parties with the same price or separate privately offered quantity selling prices. Likewise, creating a bid is a buyer's function which enables the buyer to buy a commodity that may be available in the market to one or more invited parties. FIG. 3b is illustrative of the working area 57 supporting the "create" operation 42.

Preferably in the working area 57 to add a trade deal, the end user indicates either offer or bid and either public or private to define the nature of the new trade. A public trade deal is posted to all trader end users that log into, and are authorized to access, the Web server 27 running invention program 31. In that case, a seller may obtain bids from all end users who are interested in bidding for the posted offer. A private trade deal is posted to a selected list of the server 27 end users (as further described below).

The working area 57 to add a trade deal 45 provides a field for the end user creating the trade (and hence the "originating user") to specify a campaign name or identifier for the new trade or group of trades. Next the originating user specifies a grade and geographic region (market) for the commodity being traded. In the preferred embodiment the market options are U.S. crudes, international crudes, U.S. products, international products and U.S. intermediates these categories have become more granular, for example US products has been divided into US gasoline and US distillate. The same will hold true for International Products. The originating user may select different predefined grades from these markets along with an optional default delivery location. In response the deal negotiation system 37a populates the market region and grade fields with appropriate standard specifications and populates the delivery location field. Alternatively, the originating end user may type in a grade and corresponding specifications overriding the predefined standard specifications. Predefined templates of frequently executed trades will facilitate the way trades are posted and negotiated.

Next in FIG. 3b, the originating user specifies delivery type, such as one of the standard delivery options of FOB, CIF, DLVD, etc. The end user also specifies the deal type such as a basis trade, fixed trade or index trade. The end/originating user defines delivery dates by indicating a start time and an end time of availability of the commodity being traded. Depending on the deal type, the delivery type information may vary. That is, if a basis deal type is specified, the end user may select an exchange and the contract month. If the index deal type is specified, the end user may select a pricing index and enter the pricing commodity in the working area 57. If a fixed deal type is specified, then no further options are available for delivery. If a buy/sell option is specified, then the end user may further specify commodity trade details.

Next in FIG. 3b the end (originating) user enters quantity and pricing information for the new trade deal. Included in the quantity is the unit of measurement. The pricing information includes the pricing basis and either the flat price or price differential above or below the Exchange (index) price. The pricing basis indicates how the published prices of an Exchange will be used to determine the pricing of the new trade. The pricing basis and pricing window may be, for example, price established by a settlement committee, the published Exchange price three days around the bill of lading, the published Exchange price of a designated month, the scheduled monthly average, and the like. An expiration hour or period of time may also be specified by the end/originating user. The system will keep count down and expire trades that are set to expire. The originating user may specify a different quantity, price and/or expiration time per trader to whom the subject new trade deal is posted.

Finally in FIG. 3b, the originating user selects or otherwise specifies traders to whom the new trade deal is to be posted. This may be accomplished through a selection off of a drop down list of registered end users of program 31 or a private list of the originating user selected traders. At the end of entering the foregoing information in the working area 57 to add a trade deal 45, the originating user completes the create operation 42 by signaling deal negotiation application 37a to post the new trade 45 on the deal negotiation system main screen view 41, either in the private or public sector accordingly. This selection process comprises the following sequence of events:

1. define the market and terms.
2. invite counter parties
3. set price/quantity/expiration
4. post trade(s)

After a trade is posted on the deal negotiation system invitations are sent to counter parties via e-mail, pagers, and other electronic devices.

Inviting Unlicensed PetroVantage Users to Trade

The system allows for a licensed PetroVantage User to "invite" and unlicensed PetroVantage User to a "Private" offering. The steps included are:

1. Licensed Trader sets up an Unlicensed Party in their PetroVantage Private Address Book, simultaneously creating limited access to their transactions posted to the PetroVantage deal negotiation system.
2. The Unlicensed Party becomes available to the licensed party only in the selection list in the Add A Trade application.
3. The licensed party may then select the unlicensed party to be included in a Private posting.
4. The Unlicensed Party receives an invitation to Trade via e-mail which includes a URL directing the unlicensed User to their private posting on the PetroVantage Deal negotiation system.
5. The Unlicensed User gains limited access to the PetroVantage System and only their Private postings. The Unlicensed User may then negotiate and close the deal with the licensed User.
6. The Unlicensed Users access expires over a time period with no activity Referring back to FIG. 3a, the "hold" operation 44 may be effected to one posted trade deal 45 or all posted trade deals 45 displayed and originally posted by the user in the deal negotiation system screen views 41, 43. An end user may hold only a trade deal 45 that he has posted and not trades posted by another trader user. The hold operation 44 changes the status indication (in bid/offer information 55, FIG. 3a) and prevents counterparties from closing the trade deal 45. The respective end user must resume a trade deal 45 before another trader may accept the trade deal 45.

The "resume" operation 46 enables an end user to resume one or all trades 45 that the end user has on hold. Resuming a trade deal 45 through the resume operation 46 changes the status indication to active (in bid/offer information 55, FIG. 3a) and allows other traders to close or otherwise act on the re-posted trade 45.

The "cancel" operation 48 (FIG. 3a) enables an end user to cancel one or all trade deals 45 that he has originated and posted to the deal negotiation system screen views 41, 43. Canceling a trade deal 45 permanently removes the trade deal 45 from the deal negotiation system screen views 41, 43. A canceled trade deal cannot be resumed. Only the originating user (original creator of the trade) may cancel a trade deal 45, to remove it from the deal negotiation system screen views 41, 43 of all end users.

Continuing with FIG. 3a, the "negotiate" operation 50 affects the posted trade deal 45 selected by the end user. The negotiate operation 50 enables the end user to conduct trade 45 negotiations using a secure instant messaging. That is, the path toward closing a trade 45 requires a back and forth dialog between trading partners. Traditionally the trade negotiation involves discussions on issues such as the material quality and quantity, the delivery terms, the expected arrival and departure times, the parcel details, etc.

Thus in the present invention 31, negotiating involves private message exchanges between two parties. The messages provide requested information and allow an end user and trading partners to exchange trading details in real time. In the preferred embodiment, the negotiate operation 50 provides a working negotiation window 59 as shown in FIG. 3c. The working negotiation window 59 displays summary information about the respective trade deal 45 (i.e., deal identification name or number, trade status, deal type of the trade, grade, delivery location and starting date of the delivery and the trade market—U.S. vs. international crudes vs. products).

The working negotiation window 59 also displays buyer information or seller information as appropriate. The buyer information includes buyer name, commodity description/petroleum grade, pricing basis including exchange and month that the exchange price was published, the buyer's bid or offer amount equal to, above or below the exchange price, quantity the buyer wishes to bid on, pricing window for the bid, time that the bid will remain active/expiration date time. The seller's information includes seller's name, commodity description/petroleum grade, pricing basis, the seller's offered amount that is equal to, above or below the exchange price, quantity that the seller wishes to sell, pricing window for this offer, the amount of time that the offer will remain active, messages received from trading partners and a text field for entering an instant message to a trading partner.

Additional features of working negotiation window 59 include an automated warning, or trigger alert, to indicate when other end users are attempting to negotiate. Another feature enables the end user to invite additional traders to the current posted trade 45.

Returning to FIG. 3a, the "delivery term details" operation 52 enables an end user to view and modify the delivery terms of a posted trade 45 created by that end user. In the preferred embodiment, the delivery terms may be made flexible by applying a tolerance to the subject commodity's volume. To that end, the end user specifies a percentage of the total volume or an absolute minimum and maximum limit on the commodity's quantity through the delivery term details operation 52.

The "add to decision support tools" operation 54 (FIG. 3a) enables an end user to download trade deal information of a selected posted trade 45 to a selected support tool 39. That is, trade information of a desired posted trade 45 may be shared across various working screens 33 and support tools 39 of invention program 31 without requiring the end user to re-enter and retype the information at each use of a feature or tool. The support tools 39 in the preferred embodiment are discussed later.

Figure 4A:
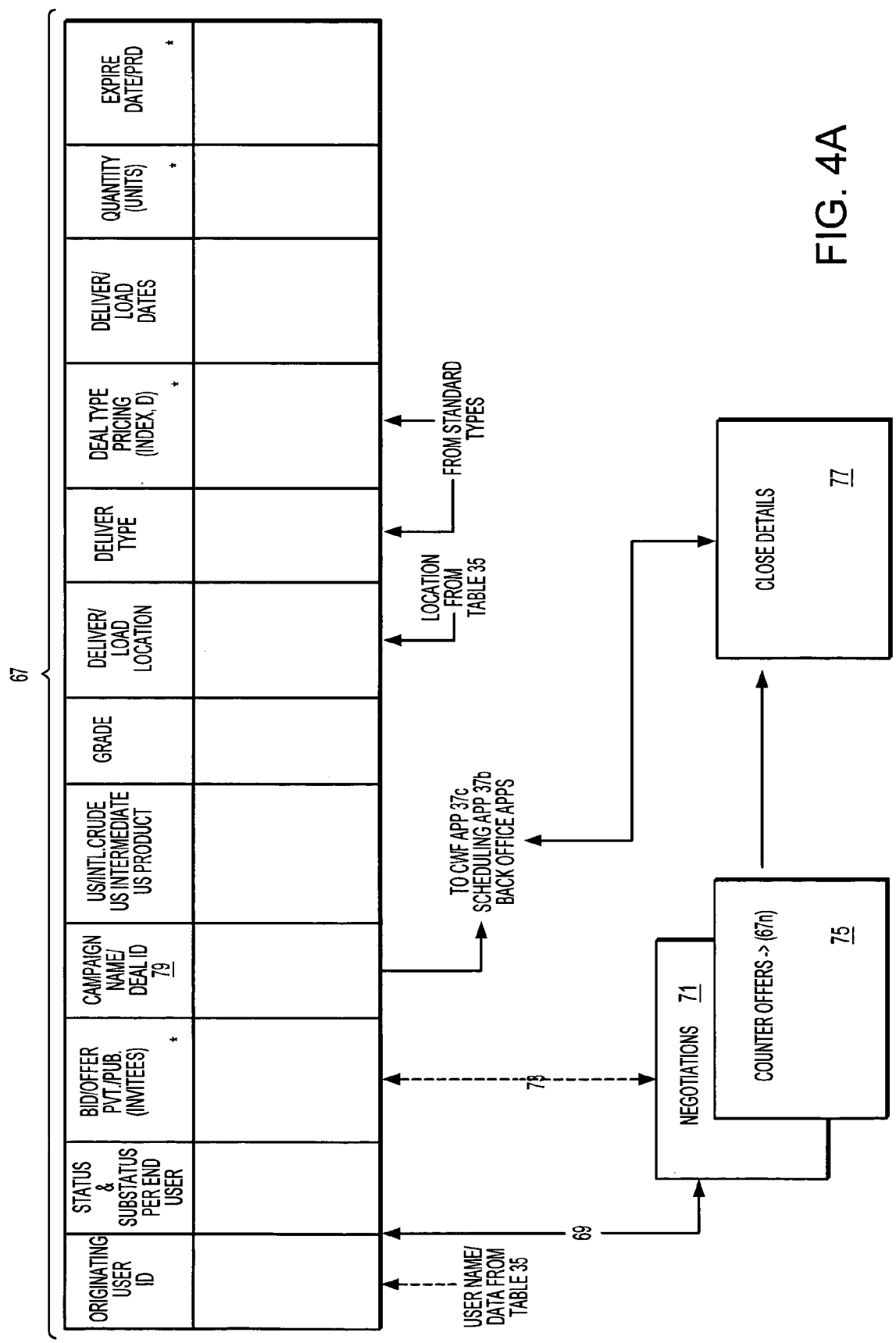
FIGS. 4a and 4b are schematic diagrams of trade deal objects and supporting tables employed in the embodiment of FIG. 2.
Figure 4B:
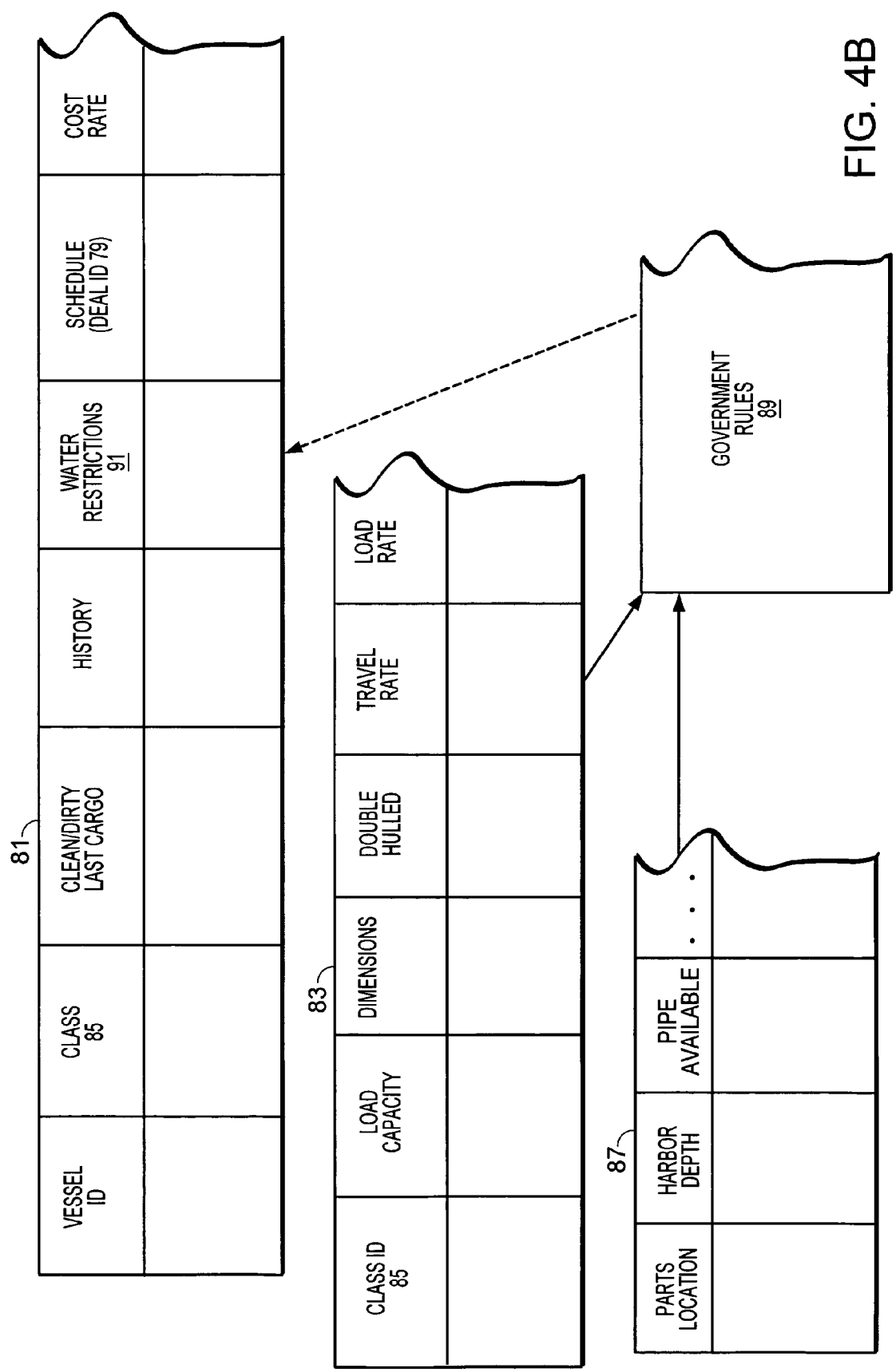

To accomplish the foregoing operations 40, 42, 44, 46, 48, 50, 52, 54 and to display the functioning thereof, in deal negotiation system main screen view and subscreens 41, 43, the preferred embodiment employs the data structures (e.g., tables and objects) illustrated in FIGS. 4a and 4b. In particular there is a respective trade object 67 (FIG. 4a) for each trade deal 45 posted on trade screens 41, 43.

Turning to FIG. 4a, trade object 67 stores the following data regarding a respective trade deal 45. Trade object 67 stores and may be indexed by originating user ID (i.e., the user ID of the end user who originally created the subject trade deal 45). The full spelling of the originating user's name is linked from table 35 to object 67. Trade object 67 stores an indication of status for bid and offer information 55 in deal negotiation system screen views 41, 43. Per end user, trade object 67 stores a substatus indication of "cancel" where the given end user has applied the cancel operation 48 to the subject trade deal 45.

Trade object 67 stores indications of whether the subject trade deal 45 is a bid or offer and a public or private trade. In the case of a private trade, the object 67 also indicates the originating user-specified invitees (recipients of the trade).

A deal ID 79 and originating end-user specified campaign name uniquely identifies the trade object 67. Consequently deal ID 79 is used as an index or key to object 67.

The trade object 67 stores deal specifications such as general market categories (i.e., U.S. crude oil, international crude oil, U.S. intermediate feedstocks and U.S. products), grade of commodity being traded, quantity, units of measure for the quantity and expiration of trade bid/offer. Trade object 67 also stores defining attributes such as delivery/load location and dates, delivery type, deal type and pricing (including index or basis, and differential relative to index/basis). Per trader, trade object 67 may indicate different deal types, pricing, quantity and expiration of the subject trade deal 45 as illustrated by the asterisks in FIG. 4a.

A log 71 of instant messages and the like from negotiations in the subject trade deal 45 is stored and linked to object 67 at 69. User ID of the traders involved in the negotiations/ messages are linked to the log 71 from the object's 67 list of invitees at 73. Access to view and/or update is determined to be "private" based on the following rules:

A trader posting a bid or offer may view and update all active transactions posted by that trader.

A trader receiving a private bid or offer may view and post counter bids/offers only against the private bid/offer made to that trader Similarly, counter offers made in this trade deal 45 are logged at 75. Details of each counter offer are stored in a respective trade object 67n. Pointers or other link mechanisms are used from counter offers in log 75 to respective trade objects 67n.

Once the subject deal is closed, the trade details at closing are indicated (directly or indirectly) at 77 and appropriately linked to trade object 67. Confirmation to both the buyer and seller is generated and sent via e-mail. Using the unique ID of trade object 67 (i.e., deal ID 79), the closing trade details 77 are shared with collaborative workflow applications 37c (FIG. 2), scheduling application 37b (FIG. 2), back office applications and so forth.

One part of the closing details 77 is vessel or transportation information for shipping the subject commodity from seller to buyer. FIG. 4b illustrates the data tables storing the supporting vessel information. For each vessel in deal negotiation application 37a, vessel table 81 indicates a unique vessel identifier, class 85 of the subject vessel, waterway restrictions 91, schedule of the subject vessel (including in-use periods indexed by deal ID 79 of closed deals 45 from deal negotiation system screens 41, 43) and cost rate. Also vessel table 81 indicates the last cargo carried by the subject vessel and whether the vessel is cleaned after that load. A history data portion in vessel table 81 indicates name of vessel, owner's name and captain's name. The historical data is optionally hidden from display to end-user traders to keep the subject vessel anonymous for scheduling purposes.

Class 85 of a vessel is defined by supporting class definitions table 83. For each class 85, class table 83 indicates load capacity, vessel dimensions, hull structure (e.g., double hulled, . . . ) travel rate and load rate. According to the indicated vessel dimensions and hull structure, vessels of the subject class are allowed or limited access to certain waterways and ports. The class definition table 83 together with a port table 87 and processing rules 89 are used to determine specific waterway restrictions per vessel in vessel table 81.

Port table 87 specifies each port by location, harbor depth, pipe availability and other accommodations. Local and federal government rules governing waterway restrictions are specified in processing rules 89 for rules-based generation of restrictions 91. Processing rules 89 are applied to a given class 85 (from class definition table 83) across all ports in port table 87 and produce the list of waterways/ports from which the given class 85 of vessels is restricted. The resulting list is indicated at 91 for vessels of the given class 85.

Figure 4C:
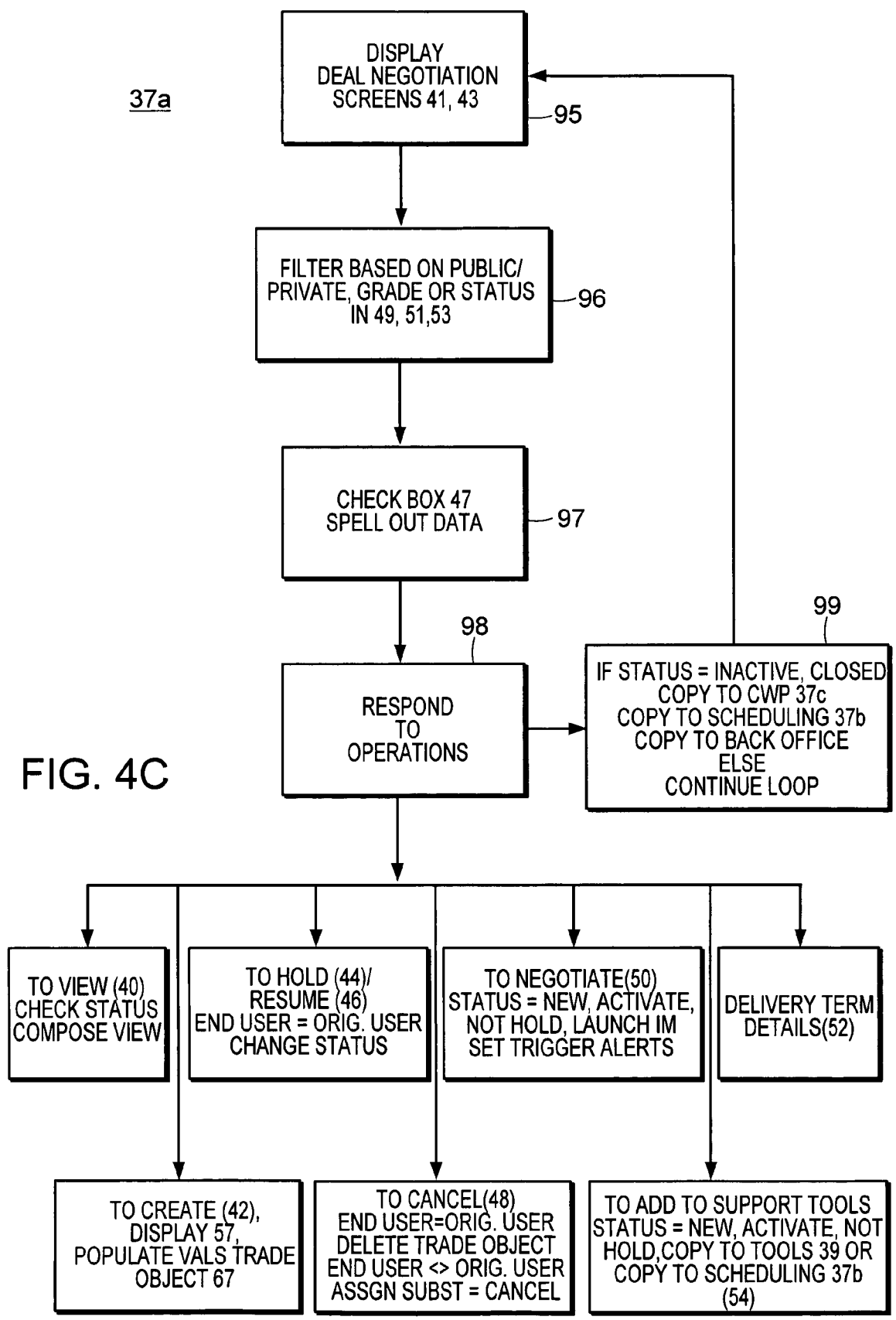
FIG. 4c is a flow diagram of the operations and screen views of FIGS. 3a–3c based on the data structures of FIGS. 4a and 4b.

Turning now to FIG. 4c, the operations 40, 42, 44, 46, 48, 50, 52, 54 and working views of the deal negotiation system 37a are supported by trade objects 67 (FIG. 4a) as follows. In step 95, per end user login, deal negotiation application 37a gathers trade objects 67 with the corresponding user ID in the object originating user ID field or invitee field. The deal negotiation system 37a uses the data from the gathered trade objects 67 to form the deal negotiation system screens 41, 43. In particular, deal negotiation application 37a displays the trade deals 45 corresponding to the gathered trade objects 67 and omits from view, the trade deals 45 corresponding to gathered trade objects 67 with substatus equal to "cancel" (from a cancel operation 48). Further deal negotiation application 37a arranges the subject trade deals 45 according to market indicated in the corresponding trade objects 67 attribute (US/International Crude oil, U.S. Intermediate feedstocks and U.S. products, FIG. 4a).

In step 96, the deal negotiation system 37a responds to the end user setting first view list 49 in FIG. 3a. In response, deal negotiation application 37a filters the displayed trade deals 45 based on public or private indication in corresponding trade objects 67 or on object status being set to "active" accordingly. In response to the end user setting the second view list 51 (FIG. 3a), the deal negotiation application 37a further filters the displayed trade deals 45 based on the originating user attribute of the trade objects 67 being set to the end user ID of the current user. Also in step 96, the deal negotiation system 37a filters the displayed trade deals 45 based on grade attribute of the corresponding trade objects 67 in response to the grade feature 53 (FIG. 3a).

In step 97, the deal negotiation system 37a checks the Tips check box 47 of FIG. 3a. If box 47 is set, then the deal negotiation system 37a links to user data table 35 (FIG. 2) and supporting standards lists (or other wise obtains the data contained therein) to display full spellings instead of abbreviations or symbols in screen views 41, 43. Full spellings of users/traders names, status indications, delivery type, deal type and pricing are available from respective lists as illustrated in FIG. 4a.

In step 98, the deal negotiation system 37a responds to operations 40, 42, 44, 46, 48, 50, 52, 54 (FIG. 3a). In response to end user activation of the "view" operation 40 on a displayed trade deal 45, deal negotiation application 37a checks the status and expiration attributes of the corresponding trade object 67. As appropriate, the deal negotiation system 37a then composes a window view with trade type, commodity details, market and pricing details, quantity and trader information, each from respective attributes of the corresponding trade object 67.

In response to end user activation of the "create" operation 42 on a displayed trade deal 45, the deal negotiation system 37a displays the working screen 57 (FIG. 3b) to add a trade and prompts the end user to enter trade details. The deal negotiation system 37a displays the predefined values/options for certain fields in response to end user request. The deal negotiation system 37a at step 42 (FIG. 4c) also populates the delivery/load location, deal type and delivery type fields of the displayed working screen 57, with respective data from the user data table 35 and standards lists. Lastly, the deal negotiation system 37a instantiates a trade object 67 with attributes set according to the values that the end user has entered into the displayed working screen 57. The new trade object 67 corresponds to the new trade deal 45 created by the end user, and steps 95 and 96 use new trade object 67 to refresh the deal negotiation system views 41, 43 to now include the newly created trade deal 45 corresponding to new trade object 67.

In response to end user activation of the "hold" operation 44 on a displayed trade deal 45, the deal negotiation system 37a checks the originating user attribute of the corresponding trade object 67. If the attribute is set to the user ID of the current end user, then the deal negotiation system 37a changes trade object 67 status to hold. In turn, the corresponding trade deal 45 status (as displayed at bid/offer information 55 in views 41, 43) is likewise changed to "hold". Similarly, in response to end user activation of the "resume" operation 46 on a displayed trade deal 45, the deal negotiation system 37a checks the originating user attribute of the corresponding trade object 67. If the attribute is set to the user ID of the current end user, then the deal negotiation system 37a changes trade object 67 status from "hold" back to "active". In turn the corresponding trade deal 45 status (as displayed at bid/offer information 55 in views 41, 43) is likewise changed back to active.

In response to end user activation of the "cancel" operation 48 on a displayed trade deal 45, the deal negotiation system 37a checks the originating user attribute of the corresponding trade object 67. If the attribute is set to the user ID of the current end user, then the deal negotiation system 37a deletes the trade object 67, thus removing the corresponding trade deal 45 from floor screen views 41, 43. If the attribute is not set to the user ID of the current end user, then the deal negotiation system 37a sets the trade object substatus attribute to "cancel". In turn, when steps 95 and 96 refresh the deal negotiation system screen views 41, 43, the subject trade deal 45 is omitted from display.

In response to end user activation of the "negotiate" operation 50 on a displayed trade deal 45, the deal negotiation system 37a checks the status and expiration attributes of the corresponding trade object 67. If the status attribute is set to new or active and not on hold, then the deal negotiation system 37a launches instant messaging and sets trigger alerts to other traders of the subject trade as indicated in the invitee attribute of the trade object 67. The instant messaging is initialized between the originating user of the subject trade (as indicated in the originating user attribute of the trade object 67) and the current end user. The deal negotiation system 37a obtains the originating user's email address from the user data table 35 as illustrated by the link to table 35 from the originating user attribute in trade object 67 in FIG. 4a. The deal negotiation system 37a further logs or stores each message at 71 in FIG. 4a. As counter offers are made, the deal negotiation system 37a follows create operation 42 steps to create a trade object 67 corresponding to the counter offer and links the counter offers 67n to the subject trade deal 45 at 75 in FIG. 4a.

In response to end user activation of the "Delivery Term Details" operation 52 on a displayed trade deal 45, the deal negotiation system 37a checks the status and expiration attributes of the corresponding trade object 67. As appropriate, the deal negotiation system 37a next checks the originating user attribute of the corresponding trade object 67. If the attribute is not set to the user ID of the current end user, then the deal negotiation system 37a composes a window with delivery location, delivery type and delivery dates information from respective attributes of the corresponding trade object 67. Otherwise, the deal negotiation system 37a composes a window for enabling the end user to specify tolerances as described previously.

In response to end user activation of the "add to decision support tools" operation 54 on a displayed trade deal 45, the deal negotiation system 37a checks the status and expiration attributes of the corresponding trade object 67. If the status attribute is set to new or active and not on hold, then the deal negotiation system 37a copies the contents of the corresponding trade object 67 and hence the specifications of the subject trade deal 45 and passes the copied data to the user-desired application 37 or support tool 39. In particular, the deal negotiation system 37a provides the copied data to scheduling application 37b and support tools 39b thereof, as well as to support tools 39a of the deal negotiation system 37a. The deal negotiation system 37a can also provide the copied data to collaborative workflow application 37c and support tools 39c thereof.

Continuing with FIG. 4c, at step 99 the deal negotiation system 37a checks the status attribute of trade objects 67. If a trade object 67 is found with a status attribute set to inactive/closed, then the corresponding trade deal 45 has been closed. The deal negotiation system 37a accordingly copies the closed deal details 77 to collaborative work flow application 37c, scheduling application 37b and to back office applications and the like for generating the contracts, confirmations and other notifications of the final deal/trade. Word processing forms and merge document technology are employed to accomplish this. In one embodiment, the deal negotiation system 37a at this juncture triggers an email message to the vessel broker/owner of the vessel indicated in the closed deal details 77 to secure/reserve the vessel. Other electronic messaging and confirmation is similarly suitable.

The deal negotiation system 37a continues looping through steps 95 through 99 in FIG. 4c as appropriate to support the end user activity in deal negotiation system screen views 41, 43 (including application of operations 40, 42, 44, 46, 48, 50, 52, 54 upon user command).

Figure 5:
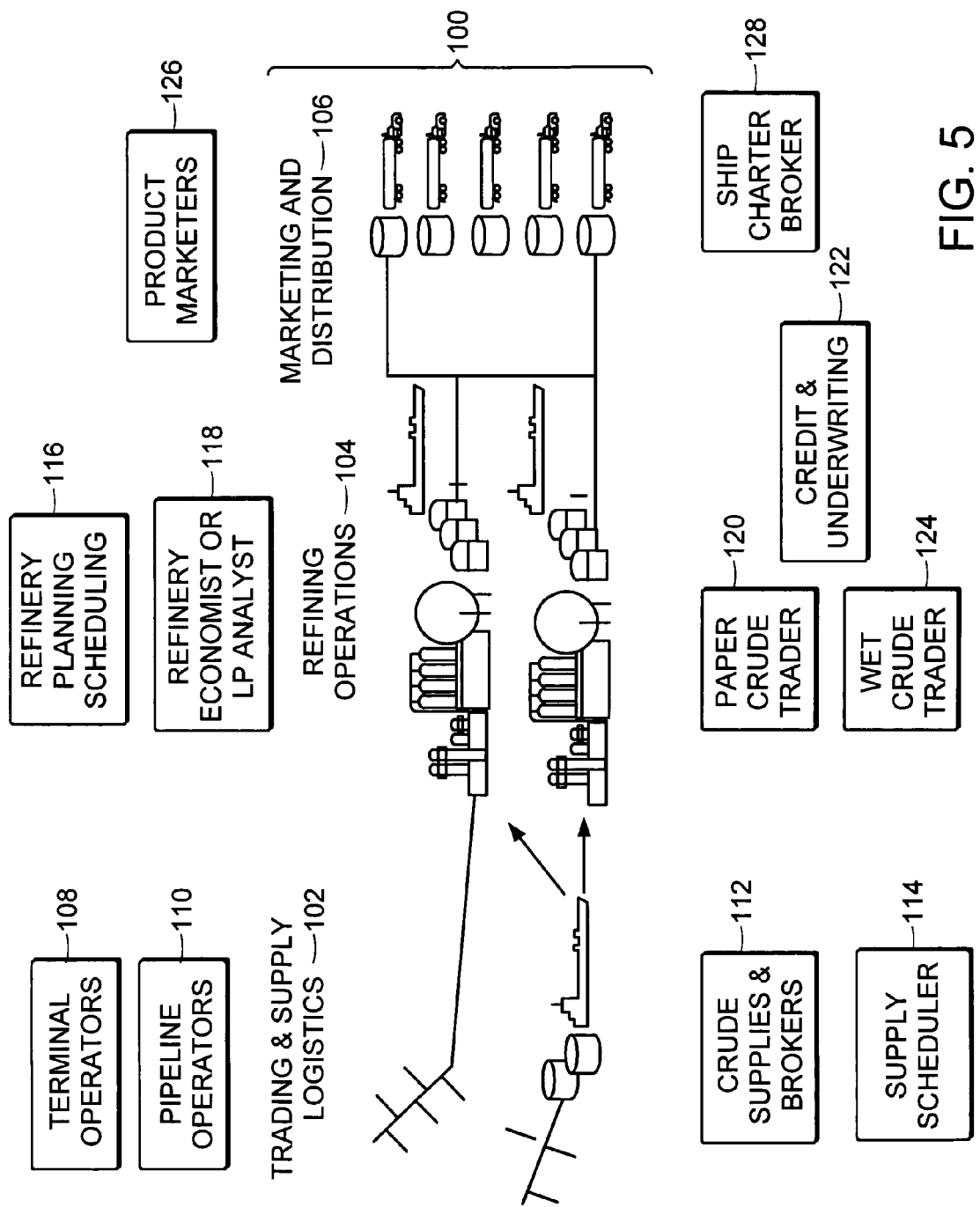
FIG. 5 is a schematic view of the supply chain and related roles in the petroleum industry.

FIG. 5 is a schematic view of the supply chain and related roles in the petroleum industry. The petroleum supply chain 100 is composed of a trading & supply logistics component 102, a refining operations component 104 and a marketing and distribution component 106. Each of these components play a role in the supply of crude oil, intermediate feedstock and finished crude products to consumers.

Trading & supply logistics component 102 comprises the tasks of moving crude from a well head through a transportation system to a refinery. Crude typically transfers through vessels, pipelines and rail to terminals controlled by a terminal operator 108. Alternately, the pipeline can be attached directly from the well head source to the refinery. Once the crude is stored in a terminal, barges, tanker ship, other pipelines or trucks are used to transport the crude oil to a refinery. Crude suppliers & brokers 112 interact with refinery supply schedulers 114 to coordinate the logistics (quantities, costs, time-frames, etc.) of supplying crude to a refinery.

Refining operations 104 process crude oil into intermediate feedstocks (e.g., butane) and finished crude products (e.g., jet fuel, gasoline) using distillation and/or catalyst-based procedures. Refineries are typically large and complex operations that require significant amounts of planning and analysis to perform at optimum levels. Refinery planning/scheduling 116 operations typically coordinate the logistics of obtaining crude for processing and allocating finished crude products for delivery in an efficient manner. Refinery economist or LP analyst 118 analyze the economics of the refinery operations. The analysis can be based on actual experience and knowledge of current situations and/or through the use of a liner programming (LP) model of the refinery.

During all aspects of the petroleum supply chain 100, traders may buy or sell the crude, intermediate feedstock or finished product in order to maximize their profit. Paper crude traders 120 will trade a petroleum product in the petroleum supply chain 100 without any expectation of ever taking delivery of the commodity. Wet crude traders 124, on the other hand, trade with an expectation of accepting delivery of a petroleum product for processing or sale. Various aspects of a petroleum trade may require credit & underwriting 122 in order to consummate the trade. Additionally, inspectors are employed at various point in the petroleum supply chain 100 to inspect and report on the quality and/or quantity of crude oil, intermediate feedstocks and petroleum products.

Marketing and distribution 126 move petroleum products produced by refinery operations 104 to retail and wholesale consumers. When the movement of petroleum products by ship is involved ship charter brokers 128 are employed to charter appropriate vessels to move the petroleum product to terminals/distribution points close to consumers. Tanker trucks often complete the movement by moving the petroleum products to their final destination (e.g., retail gasoline stations) where product marketers 126 have initiated marketing and sales campaigns to sell the petroleum products.

As mentioned above, the deal negotiation system 37a provides support tools 39 for the various end users, including refinery supply traders (e.g., wet crude trader 124), product traders, brokers, plant analysts (e.g., refinery economist or LP analyst 118) and the like. The process of trade deal evaluation is supported by a set of decision support tools that help the end user to quickly evaluate crude oils and petroleum products for supply, blending and trading purposes. These tools include profit margin evaluation tools, component blending and trading tools, transport scheduling tools, arbitrage tools and automated search engine tools.

The decision support tools are a set of applications based on supply chain management technology, including Aspen Process Industry Modeling System (PIMS), the leading process industry planning software; Aspen MIMI; and Aspen Bulk & Retail (see *Process Industry Modeling System Training Manual Part* 1, Jun. 1, 1998 and *Process Industry Modeling System Training Manual Part* 2, Jun. 1, 1998) each by Aspen Technology, Inc., of Cambridge, Mass., the entire teachings of which are incorporated herein by reference. Using these tools, traders and schedulers can quickly identify and evaluate trading and logistics opportunities; specifically, these tools allow traders and schedulers to:

estimate the potential value of specific crudes—or combinations of crudes—against a particular set of target refineries in a real-time market environment, evaluate the relative margins of available crudes in order to make the optimal supply decision, determine the value of intermediate feedstocks—either those in the market or those within the company's own processing facilities, find the most efficient way to acquire or dispose of product blend components and on-spec products to meet the company's current and strategic business needs and maximize the profit margins, evaluate discounted market blendstocks when they become available on short notice and enhance profitability with faster response to rapidly changing market opportunities.

Decision support tools can be used on a stand-alone basis or in conjunction with existing refinery planning and scheduling applications in order to leverage the more detailed linear program (LPs) programming models. The decision support tools provide: instant and secure access from any Web browser, integration with other software platforms (e.g., the deal negotiation system 37a), providing immediate access to the benefits of the collaborative workflow application 37c. Only one click is required to access the decision support tools from the deal negotiation system 37a.

Easy-to-use manual entry screens to input deal information gained from telephone or face-to-face conversations are provided. A library of international product specifications and crude assays is available. The ability to override any input data, including product and components specifications is provided. The decision support tools provide the ability to perform "what if" analysis and perform automatic pricing uploads for a given product and time period from all major price feed sources, including Platt's, NYMEX, and IPE, as well as third-party private forward price curves. The user can build complex price formulas to value un-priced commodities, based on qualities and relationships to other commodities.

In the preferred embodiments, various Crude Oil Evaluation (COE) tools are used to evaluate profit margins by refinery (e.g., COE-R) or by yield and quality (e.g., COE-Q). Additionally, evaluation tools are used to evaluate profit margins for Intermediate Feedstock Selection (IFS).

The Crude Oil Evaluation by Refinery (COE-R) tool is designed for Equity Crude Oil Marketers, Refinery Supply Traders and Trading company professionals who need to evaluate the current market value of a crude oil or blend of crude oils against multiple refineries' specification limits in various geographical locations. Since the refinery configuration, crude oils, product specifications, and prices are different for each region the user need the tool to evaluate the profit margins of refineries against the available crude oil or blend of crude oils. This information can be used to increase revenues by trading with refineries that can get the maximum benefits from a given batch of crude oil.

The Crude Oil Evaluation by Quality (COE-Q) tool enables traders to perform a quick evaluation of crude oil stocks and transportation costs in order to calculate the incremental net value of each crude oil based upon accurate yield and product quality. Using this tool, the trader performs simultaneous analysis of different crude oils to purchase and make a margin-based real time crude oil deal selection decision.

The Intermediate Feedstock Selection (IFS) tool allows traders to evaluate deal negotiation system components to ensure their compliance to the desired intermediate refinery component specifications, required volumes and the acquisition strategy. The trader can use this tool to perform an in-depth analysis of available components and their impact on the overall economics and logistics of a trade deal.

The component blending and trading tools include Crude Oil Blending and Trading (COBAT), multi-Component Blending and Trading (CBAT) tools for gasolines (CBAT-G), for fuel oils (CBAT-F) and for diesel fuel blends (CBAT-D).

The Crude Oil Blending and Trading (COBAT) tool is used to evaluate the most efficient combination of available crudes to meet refinery specification limits and to complete a refinery supply program. It enables traders to evaluate a wide range of crudes to determine the optimal combination of constrained raw materials needed to produce specific amounts of finished product at the lowest cost.

The purpose of blending crude oils is to produce certain types of feedstocks with specific characteristics. Refineries can use these composite feedstocks to optimize their profit while meeting the refinery specifications limits. To make the right selection of components and to optimize the use of downstream conversion units in a refinery, refinery supply traders 116 and analysts 118 need to consider the following: different refinery specifications, monthly refinery requirements, the variety of crude oils available in petroleum markets in geographical zones worldwide, the spectrum of crude oils to produce an intermediate petroleum product that would meet the refinery specifications and fluctuating oil prices.

Thus in the preferred embodiment, the COBAT tool is designed for traders and analysts who need to perform a quick "what-if" analysis to determine whether a particular crude or crudes being blended with other crudes will ensure the optimal final result that would meet the specifications and yield required by the processing refinery. Using COBAT, traders may evaluate a wide variety of crude oils to determine the optimal combination of raw materials needed to produce specific amounts of finished product at the lowest cost. It also helps them to evaluate the relative margins of crudes available in the market in order to make the right negotiating or purchasing decision.

In one preferred embodiment a trader selects and enters volume and characteristics of each of his current crude oils in stock, recent purchases, and any term supply he may have. This data can be entered manually or uploaded from the company mid office application. The trader sets the specification for the required final crude blend including various properties of the target composite. Preferably the properties include API quality, density, sulphur content, bulk pour point and others, estimation of quality and product yield of particular crude oil. Once the trader has defined characteristics of the desired composite(s), he selects crude oils whose combination might meet the refinery specification limits and produce the required volume of this composite at the lowest price. The negotiation operation discussed above allows the trader to upload information about a wide variety of crude oils available in the market and to see the current prices for each of these.

Upon trader command to evaluate, COBAT performs a "what-if" analysis to determine whether the target crude oil composite meets the specifications and yields required by the processing refinery. The trader makes a business decision based on the results of the analysis performed by the COBAT tool. The trader reviews the results and makes a purchasing decision. As soon as the trader has made a decision to buy, he employs the negotiation operation on the corresponding posted trade deal 45 of deal negotiation system screen views 41, 43 to negotiate the deal. The trader closes the deal, saves the results and exits the application 37a.

The multi-Component Blending and Trading (CBAT) tool is used to rapidly evaluate the marginal value of various blend stocks available in the market, providing traders with the most economic way to acquire or dispose of blend components to satisfy long/short positions. The tool functionalities may be used for various grades of gasoline including Reformulated, Conventional and CARB Gasolines (CBAT-G tool), Fuel Oils of various qualities (CBAT-F tool), and kerosene, jet fuel, and diesel fuels blends (CBAT-D tool). Restated, multi-component blending is a complex process that allows Traders and Analysts to make the best use of the available blendstocks in the market. Multi-component blending produces a variety of refined products, including different grades of gasoline, jet fuel oil, diesel oil, or lubricants. Each blend component has its own unique physical and chemical characteristics or properties. These components can be mixed with other components to create a finished product specification.

The Component Blending and Trading—Gasoline (CBAT-G) tool helps the trader to choose the type and quantity of each available blendstock needed to produce the desired volume of specific grades of gasoline. It also provides the actual value of each gasoline component, which allows the trader to calculate the marginal value of each gasoline component to produce or to buy.

By way of background, to produce what is known as finished gasoline, several components must be mixed together. Depending on what grade of gasoline one is trying to obtain, the target product may include six or more blending components. The quality and marketability of the finished product are determined by: (i) the product compliance with the gasoline specifications; and (ii) the product ability to meet local regulatory and economic requirements in different geographical locations.

Employing the CBAT-G tool, one can select and define the target product. In the preferred embodiment, the user scrolls up or down a predefined list to find the desired product to be made and selects the name of the desired gasoline grade from the list of predefined products. One may select as many products as desired, depending on how many gasoline blends are desired to be produced. Next, the user views the product specification for each selected gasoline blend. The product specification lists various gasoline properties, such as API gravity, octane number, sulfur content, etc. The user may review the gasoline blend specifications, or modify it according to desired specifications for gasoline performance. To do that, the user types in a new value for a property desired to be changed and presses a "Save Data" button at the bottom of the page. Once the user has saved the modified specifications, it will be automatically added to the list of custom blends below the predefined list of original products.

Once the user has defined characteristics of the desired final product(s), the user selects gasoline components whose combination might meet the target product specification and produce the required volume of this product at the lowest possible cost. The negotiation operation (discussed above) allows the user to select from a wide variety of gasoline components available in the market and to see the current pricing information for each of them. The user enters the desired minimum and maximum quantity and price for each added component. Once he has finished defining the components, CBAT-G evaluates the components to determine the optimal combination of gasoline components.

While evaluating the optimal combination of gasoline components, CBAT-G considers the availability and price of the optional product, compares it to the same parameters of the required components, and decides whether or not it should be used for blending. An optional parameter tells CBAT-G that the minimum volume specified is a lower threshold limit. This means CBAT-G will choose the best solution for either zero or between the minimum and maximum allowed but not between zero and the minimum. If the optional component is used for blending, the volume will be greater than the minimum amount mentioned. If the option parameter is not used, CBAT-G will use at least the minimum quantity of each added component.

Depending on whether or not the user has any gasoline components on hand, he may start the evaluation or continue the selection process. If he decides to use the gasoline components he already has in stock, he proceeds to the In-Stock or On-Hand Components view. Otherwise, he presses the Evaluate button to start the data analysis.

Once CBAT-G completes the analysis of data, it displays the Result page (see FIG. 13b). While evaluating the combination of existing gasoline blend components, CBAT-G tries to find a feasible and optimal solution for the most cost-effective gasoline blend that will meet the target gasoline specifications and yields desired by the processing refinery. In one example, after having analyzed all possible combinations of the selected gasoline blend components, CBAT-G chose the most cost-effective combination of the Negotiation Center MTBE, Normal Butane, Lt Alkylate and Russian Naphtha to produce the desired volume of Colonial PL Conv 93. The target product is checked to determine if it meets the desired specification requirements. The specification page for the Colonial P/L Conv 93gasoline will appear. The top portion of the specification page indicates the proportion of each blending component in the finished product. The lower part of the specification page shows blended products of the finished product that meet all specification requirements, with the API Gravity, Research Octane, Motor Octane, Benzene and other properties values falling between the lower and upper bounds imposed by the processing refinery. The user clicks the Save Data button to save the final product specification to their local system.

The Component Blending and Trading—Diesel (CBAT-D) tool helps the trader to choose the type and quantity of each available blendstock needed to produce the desired volume of specific grades of diesel oil.

By way of overview, the purpose of distillate blending is to manufacture a variety of products including various grades of diesel oil and kerosene, jet fuel oil, and gas oil. The actual production of the amounts of specific products fluctuates within limited parameters, based on seasonal demands or economic market situation. During the blending process, various refinery streams are mixed together to create finished products that should conform to the refinery product specification and meet local regulatory and economic requirements in different geographical locations.

The CBAT-D tool enables the user to: evaluate feasibility and cost-effectiveness of specific blendstocks available in the market, find the optimal way to acquire or dispose of blend components to meet the company current and planned business needs and maximize the profit margins and rapidly estimate the potential value of finished products based on blending components specifications.

Employing CBAT-D, the user selects the name of the required distillate blend from a Blend Specifications table. The user may select as many products as he likes, depending on how many distillate blends he wants to produce, but he can add only one product at a time. Before beginning to enter the quantity and price information for the desired distillate product(s), the user may view and modify the specification for the selected product. The specification is set by the ASTM and lists basic properties of the selected jet fuel, such as API gravity, Sulfur Content, Flash Point, Freezing Point, Smoke Point, Pour Point, etc. The CBAT-D functionality enables the user to create a new product specification by modifying the existing specification properties as viewed in a separate working window.

Changing the specification does not modify the underlying database entry. The saved specification will only be available to the author of the specification. Once the user has saved the modified product specification, it will be automatically added to the list of custom blends below the predefined list of original products.

Once the user has defined characteristics of the desired final product(s), he selects blend components whose combination will meet the final product specification and produce the required volume of this product at the lowest cost. The deal negotiation screen views 41,43 and above discussed functionality allows the user to select from a wide variety of distillate components available in the market and to see the current pricing information for each of them.

Depending on whether the plan is to use any Distillate components in stock for blending, the evaluation may be started or the selection process may continue.

To choose certain amounts of in stock components for blending with components selected from the deal negotiation system: the user selects the desired distillate blendstock from the In-Stock or On-Hand Components view, selects the desired blending date from the dropdown list box, enters the name of the destination place for the product delivery, presses the Add button at the bottom of the screen to move the selected component into the table, closes the dialog box, enters the maximum quantity he wants to use and the cost of the component, checks the Optional checkbox if needed and finally presses the Evaluate button to start the data analysis.

Once CBAT-D completes the analysis of data the user has entered, it displays the Result page similar to the one shown in FIG. 6. While evaluating the combination of selected distillate components, CBAT-D tries to find the optimal solution for the most feasible and cost-effective distillate blend that will meet the target product specifications and yields desired by the processing refinery.

In one example, after having analyzed all possible combinations of the selected blend components, CBAT-D chose the most cost-effective combination of the deal negotiation system HT Kerosene and Straight-run Kerosene to produce the desired volume of Jet Fuel. To make sure that the final product meets the specification requirements, a user clicks on the downward arrow in the Resultant Product Blends page. The specification page for the Jet Fuel blend then appears. The upper portion of the specification page indicates the composition of the finished product (40% of HT Kerosene+60% of Straight-run Kerosene). The lower part of the specification page indicates that the target product meets all specification requirements, with the API Gravity, Sulfur content, Smoke Point and other properties values falling between the lower and upper bounds imposed by the processing refinery. To user saves the final product specification to their local system, by clicking the Save Data button.

The Component Blending and Trading—Fuel (CBAT-F) tool helps the trader to choose the type and quantity of each available blendstock needed to produce the desired volume of specific grades of fuel oil. The purpose of Fuel Oil Blending is to manufacture a variety of products including various grades of bunker oil, furnace oil and heating oil.

By way of background, during the blending process, various refinery streams are mixed together to make a finished fuel oil product with specific qualities and characteristics. Typically, a refinery uses its own raw materials, but sometimes a trader has to purchase blendstocks in the open market to produce a specific amount of the target product at the lowest cost. While evaluating various blendstocks to purchase, the trader should consider the following: the processing refinery's specification limits, seasonal demands (i.e., during the winter, a refinery produces more heating oil) and economic market situation (fluctuations in product prices and demand/supply balance).

The CBAT-F Tool enables the user to evaluate feasibility and cost-effectiveness of specific blendstocks available in the market and to rapidly estimate the potential value of finished products based on blending components specifications.

In the preferred embodiment, the CBAT-F tool is used to select the name of the required Fuel Oil blend from the Blend Specifications List Box in the Target Product table. A user elects as many products as desired, depending on how many fuel oil blends he wants to produce. To view the specification for the desired product, the user clicks on the downward arrow button to the right of the product name. The specification page will appear. The specification lists basic properties of the selected fuel oil, such as API gravity, Flash Point, Pour Point, Viscosity, etc.

To modify the product specification according to a user's own quality requirements, the user types in a new value for a property he wants to change and presses the Save Data button at the bottom of the page. The specification will be saved to the user's local system (note: changing the specification will not modify the underlying database). The saved specification will only be available to the author of the specification. Once the user has saved the modified specification, it will be automatically added to the list of custom blends below the predefined list of original products. To move it to the target view, the user clicks on the button to the right of the list.

Once the user has defined characteristics of the desired final product(s), he needs to select fuel oil blend components whose combination will meet the target product specification and produce the required volume of this product at the lowest cost. The deal negotiation screen views 41, 43 functionality allows the user to select from a wide variety of fuel oil components available in the market and to see the current pricing information for each of them.

To select components using the negotiation operation, the user clicks on the Add button in the upper right corner of the view. The Select Component and Location dialog appears. The user selects the Fuel Oil component he wants to use for blending from the Components list box. The user select the desired blending date from the drop-down list box. He enters the name of the destination place for the product delivery into the Location box. He next presses the Add button at the bottom of the dialog to move the selected components to the Negotiation Center Components view. To close the dialog, the user presses the Close button. If the user wants to view and edit specs for the selected components, he clicks on the arrow button to the right of the component name. The user enters the desired minimum and maximum quantity and price for each added component. Once he has correctly defined all the selected components, the Evaluate button appears at the bottom of the screen allowing him to start the data analysis.

While evaluating the optimal combination of Fuel oil components, CBAT-F will consider the availability and price of the optional product, compare it to the same parameters of the required components, and decide whether or not it should be used for blending. The user checks the Optional checkbox if needed. Note that checking Optional tells CBAT-F that the minimum volume specified is a lower threshold limit. This means CBAT-F will choose the best solution for either zero or between the minimum and maximum allowed but not between zero and the minimum. If the optional component is used for blending, its volume will be greater that the minimum amount mentioned. If the user leaves the checkbox unchecked, CBAT will use at least the minimum quantity of each added component.

Depending on whether the user has any Fuel Oil components on hand, he may start the evaluation or continue the selection process. If the user decides to use the Fuel Oil components already in stock, he proceeds to the In-Stock or On-Hand Components view, otherwise, he presses the Evaluate button to start the data analysis (note: the Evaluate button appears at the bottom of the screen only if all necessary components are properly defined, if the definition was incomplete, the user will see an appropriate warning instead).

Once CBAT-F completes the analysis of data entered by the user, it displays the Result page similar to the one shown in FIG. 6.

While evaluating the combination of existing fuel oil components, CBAT-F tries to find the optimal solution for the most feasible and cost-effective Fuel Oil blend that will meet the target product specifications and yields desired by the processing refinery.

In one example 700 bbl of fuel oil are required, after having analyzed all possible combinations of the selected blend components, CBAT-F chose 400 bbl of the optional Naphtha, 200 bbl of the required Heavy Oil Cracker Cycle Oil, and only 100 bbl of Heavy Oil Cracker Distillate that is the most costly of all components. The finished product meets the target product volume requirements (700 bbl) and maximizes the profit margin ($3800).

Figure 7:
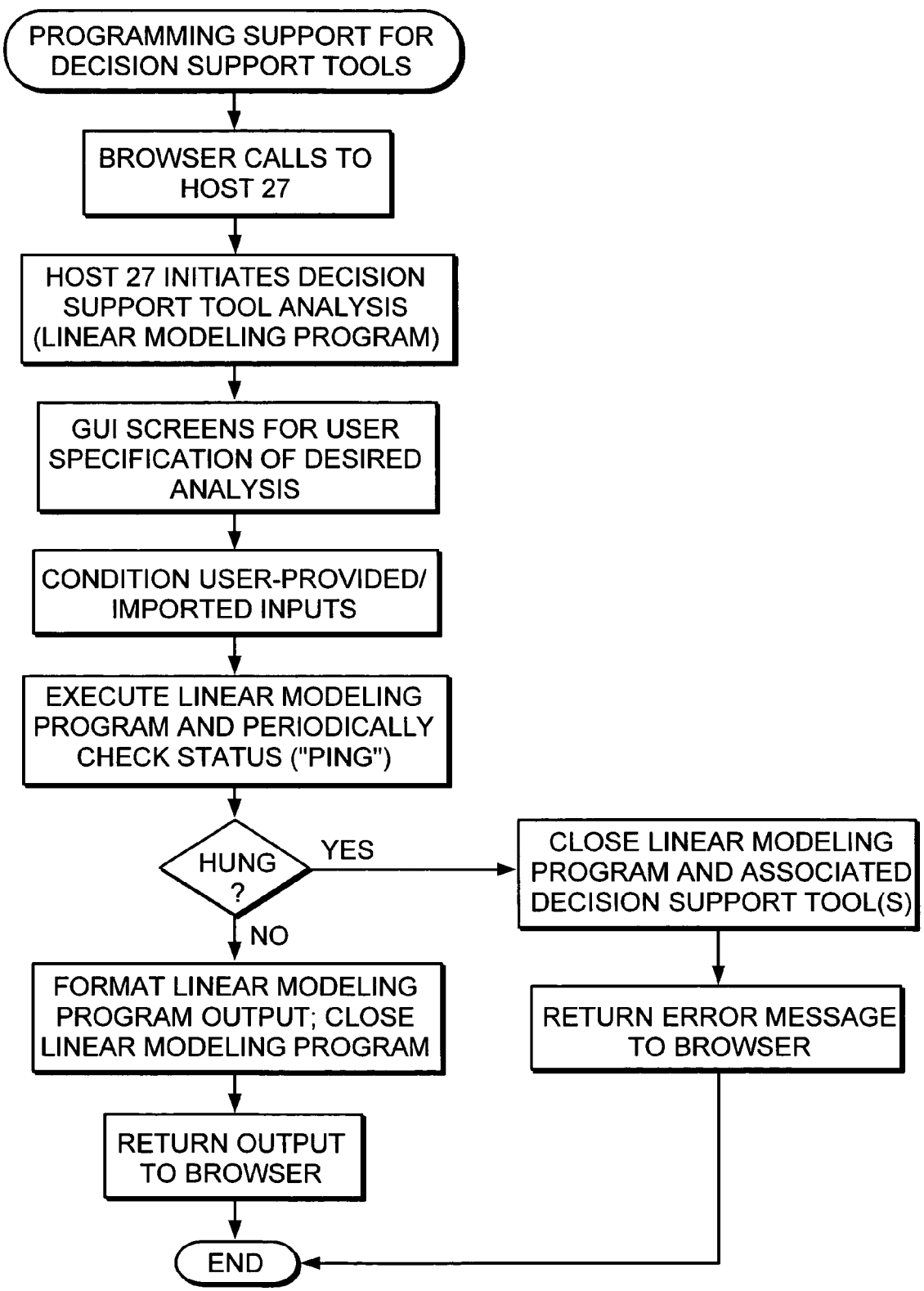
FIG. 7 is a flow diagram of an online analysis program supporting decision support tools of the preferred embodiment of the present invention.

The foregoing decision support tools are executed as non-client computer resident processes as illustrated in FIG. 7. Typically, a user on a client computer 25 (FIG. 1) launches a browser program (e.g., a Web browser, such as Microsoft® Internet Explorer). The browser program accepts a Uniform Resource Identifier (URI) as a target address (e.g., www.petrovantage.com\lp-models) for a host computer 27 (FIG. 1). The host computer 27 manages and executes linear programs to provide analysis of a specific aspect of petroleum trading, refining or logistics. Hosting the decision support tools 39 on a non-client computer 27 avoids problems associated with specific client computer 25 installations and provides for improved maintenance situations. Providing the decision support tools 39 on an Internet-connected host 27 allows users access from any Internet-connected client computer 25 with effectively unlimited availability.

A conventional linear program for running petroleum trading, refining or logistics models is Aspen PIMS. The models requires various inputs that are typically supplied through an input spreadsheet (e.g., Microsoft® Excel) read by the linear program. Embodiments of the present invention replace the spreadsheet input mechanism with a series of graphical user interface screens that allow the user to enter input data in real-time about the specific petroleum trading, refining or logistics problem as described above for the CBAT, COBAT and COE tools. Additionally, embodiments of the present invention can receive input data about the specific petroleum trading, refining or logistics problem as a programming object (e.g., trade object 67).

Conditioning of the various inputs to the linear programming models allows for improved reliability. Conditioning involves placing the various inputs in better order for processing and can include format and units of measure conversions (e.g., API v. specific gravity).

Analysis of a particular petroleum trading, refining or logistics problem includes receiving the input data describing the problem to be solved. This data is conditioned such that the linear program operates most effectively. Additionally, certain equations that make up the linear programming model are modified to account for the fact that multiple instances of the linear program may be executing. In particular, known unreliable paths of existing linear programming models are avoided, or minimized, in the equations that form embodiments of the present invention. The modifications provide for increased stability in a multi-instance environment.

Management of the linear programming model on a host computer 27 involves a cycle of launch/execute, check status and close. Multiple instances of the linear programming model can be running simultaneously. The host computer 27 periodically checks the status by "pinging" a specific instance. In the preferred embodiment, status checking/pinging occurs every three seconds. Pinging is a non-resource intensive operation directed at an instance to determine whether it is still executing (i.e., not hung). An executing instance will respond to a ping. This allows the host computer 27 to clean-up instances that have "hung" (i.e., are no longer responding to a ping). An example of a system that supports pinging is the Microsoft® Component Object Model (COM) system.

Output from the linear programming analysis is packaged using standard Internet protocols for display (e.g., HTML or XML with Cascading Style Sheets). The output is sent over the network 23 using standard HTTP communication standards. This output mechanism allows a standard Web browser to display the output from the linear programming analysis, where conventional systems typically produce output as a spreadsheet-formatted or database-formatted file.

The combination of Internet access to a non-client computer resident linear programming model (included as part of software program 31), use of HTML protocol for reporting, use of HTTP protocol for communication, providing stability through variable/equation conditioning and real-time access provides a much improved user experience for analysis of petroleum trading, refining or logistics problems. Further tools are available in the preferred embodiment of deal negotiation system 37a. For instance, the arbitrage analyzer tool is designed for refinery supply traders, trade houses, cash brokers, ship brokers, producers/marketers, and the like, enabling them to automatically monitor and analyze fluctuations in the economics of crude oils and refined products. The tool continuously monitors the changing market opportunities, including cross commodity prices and freight-arbitrage relationships, in order to evaluate margin opportunities (e.g., FOB versus CIF decisions). Additionally, users can quickly respond to short notice market opportunities and make timely decisions to capture the advantageous yields versus cost opportunities.

Figure 6A:
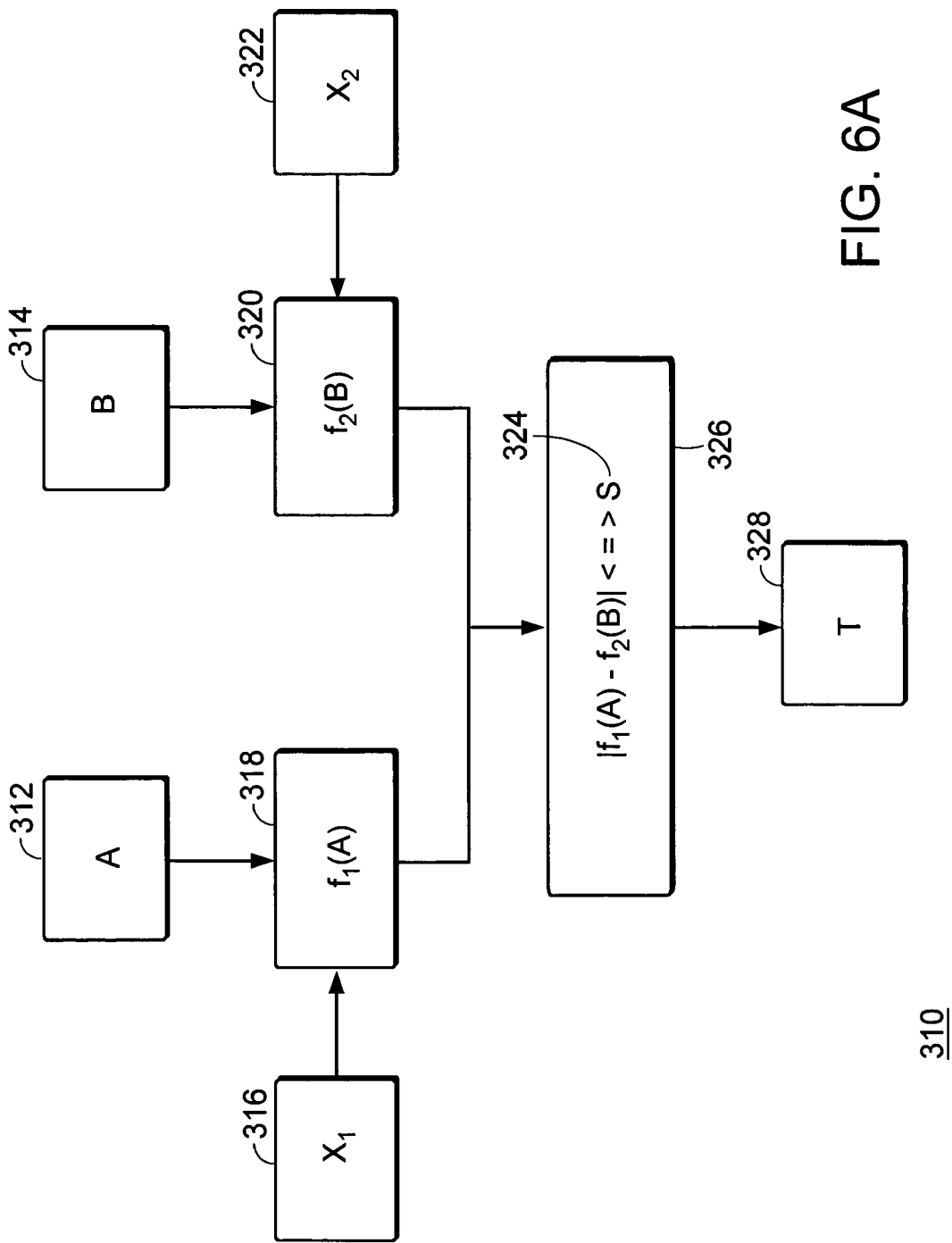
FIG. 6a is a block diagram of an arbitrage analyzer configured according to an embodiment of the present invention.

FIG. 6a is a block diagram of an arbitrage analyzer 310 configured according to an embodiment of the present invention. An arbitrage relationship is defined as having two elements (offerings) that will be adjusted and compared in order to determine if a predefined spread has been triggered.

In a preferred embodiment of the present invention elements A 312 and B 314 define two elements of an arbitrage relationship. Adjustments are made to the elements A 312 and B 314 using functions f1 318 and f2 320, respectively. These adjustments allow for more effective comparisons. Functions f1 318 and f2 320 take inputs X1 316 and X2 322 in order to produce outputs. The difference between adjusted elements A 312 and B 314 is compared (e.g., less than, greater than or equal to) to a predefined spread, S 324, by arbitrage function 326 to determine if a trigger, T 328, should be activated.

In the simplest case f1 318 and f2 320 are the identify function and elements A 312 and B 314 are processed through the arbitrage analyzer unadjusted. In more interesting cases, elements A 312 and B 314 are adjusted using algorithms and internal and external data to condition those elements for comparison. Inputs X1 316 and X2 322 need not be simple scalar values, these inputs can be the results of economic evaluation tools (e.g., COE-R) or blending analysis tools (e.g., COBAT), described above.

In one example element A 312 represents an available crude oil in one part of the world (e.g., Brent crude) while element B 314 represents an available crude in another part of the world (e.g., West Texas Intermediate). Functions f1 318 and f2 320 act on elements A 312 and B 314 using data X1 316 and X2 322. This data will typically include the commodity (crude) price. Additionally the present invention will factor in other external data elements such as freight options/costs, financing options/costs, contract and delivery times, storage options/costs, the time value of money, and the like. The results of all the adjustments are normalized into a price for each arbitrage element. For example, the Brent price might come out to $34 per barrel, whereas the West Texas Intermediate price might come out to $35 per barrel. A trigger T 328 can be set to detect when the price per barrel of these two commodities differ by more than $1 per barrel. The triggers can be visual, audible and/or activated to execute another processes (e.g., a messaging or electronic mail system).

This "geographical arbitrage" is only one example of the types of arbitrage analysis available in the present invention. The arbitrage elements can represent crude oil, intermediate feedstocks and/or petroleum products. Arbitrage relationships do not necessarily have to be defined on identical element types (e.g., crude v. crude, or product v. product). Interesting arbitrage relationships can be defined on dissimilar elements (e.g., Brent crude v. U.S. unleaded gasoline).

In another preferred embodiment a user-interactive graphical user interface (GUI) is provided to define trader specific arbitrage views (e.g., Brent crude v. West Texas Intermediate). The GUI allows a user to select a specific region of the world (e.g., by clicking on an interactive computer map) and view a list of posted crude oil prices from online pricing feeds, such as Reuters or Platts. The use can choose a desired crude oil and select another crude oil to make up an arbitrage relationship. Graphically this is accomplished by using interactive graphic tools to draw a line (i.e., define an arbitrage relationship) between two geographical regions and selecting specific crude oil products. Once an arbitrage relationship is defined a graph based on the associated data from the online pricing feeds is produced. The graph provides a visual comparison of price differences between the crude oils that make up the defined arbitrage relationship. Alarms and triggers may also be set execute when the price differential reaches, exceeds, or drops below a predefined limit. Alarms and triggers can be audible, visual or based in other mediums.

Figure 6B:
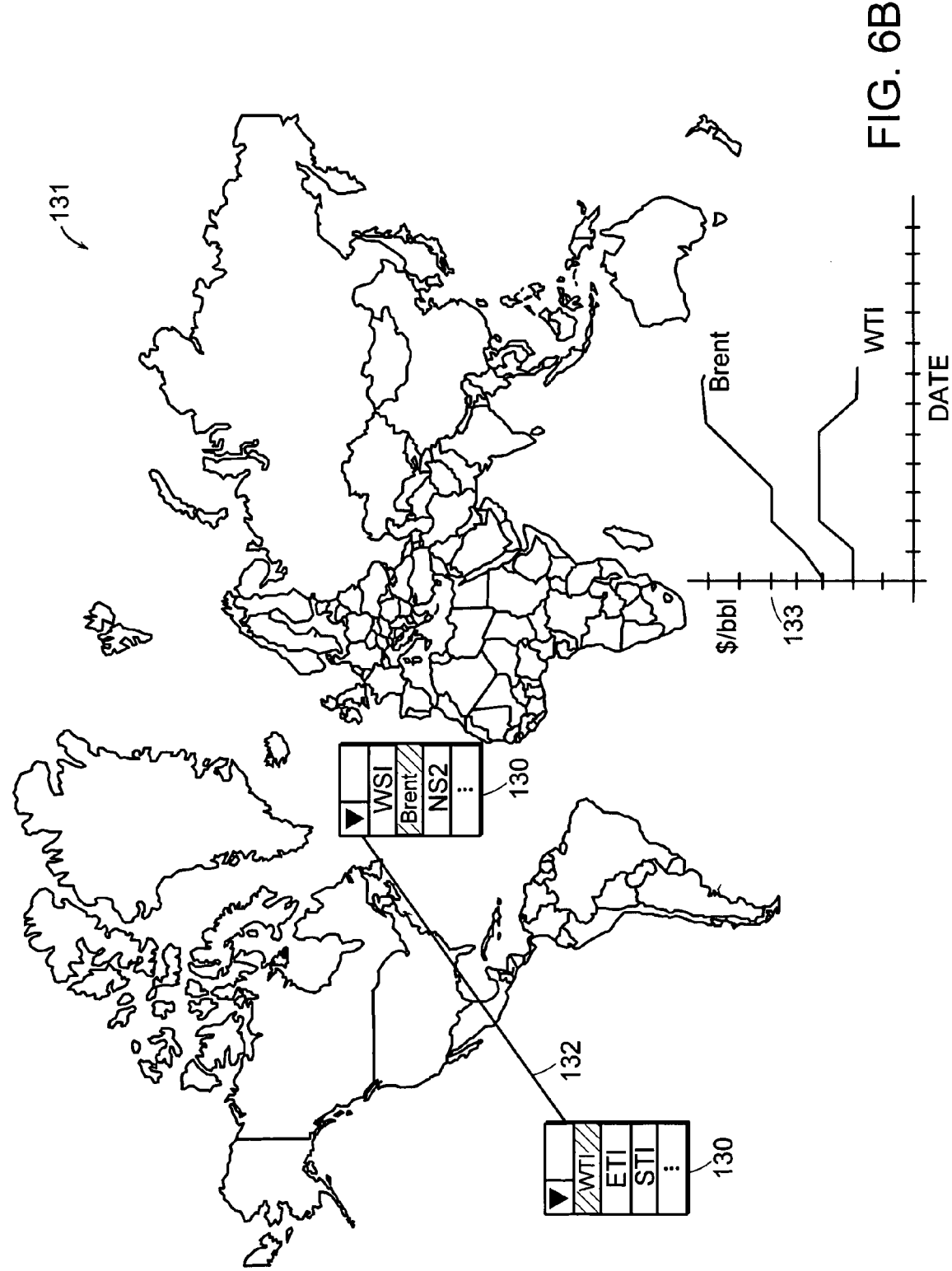
FIG. 6b illustrates a graphical user interface for defining and viewing an arbitrage relationship configured according to a preferred embodiment of the present invention.

FIG. 6b illustrates a graphical user interface for defining and viewing an arbitrage relationship configured according to a preferred embodiment of the present invention. A world map 131 is displayed in order to focus the user's selection of a particular crude oil on a specific geographic region (e.g., the North Sea v. Texas). The user invokes (e.g., by right-clicking a mouse button) the selection tool 130 to display a list of available crude oil for that geographic region. For example, when the selection tool 130 is invoked over the North Sea are off the coast of the United Kingdom, North Sea 1, Brent and North Sea 2 crude oils are displayed. The geographic region boundaries are preset, and re-configurable. Selection tool 130 allows a user to select an available crude oil and using a pointing device (e.g., a mouse), to draw a line 132 to another geographic region of the world represented on the world map 131. Once the line 132 is drawn the selection tool 130 is invoked for the end-point of the line 132. For example, if the end-point is located near Texas, US, the selection tool 130 can display West Texas Intermediate (WTI), East Texas Intermediate (ETI) and South Texas Intermediate (STI). The user now selects an additional available crude oil to define an arbitrage relationship. An arbitrage charting tool displays an arbitrage chart 133 that shows the difference in per barrel price of each of the selected crude oils over a predefined time. The arbitrage analyzer tool allows a trader to visualize differentiations among arbitrage relationship elements.

Embodiments of the present invention provide petroleum trading, refining and logistics aware search engines. These specialized search engines recognize attributes associated specifically with petroleum trading and logistics. The search engines contain search-library knowledge bases which define attributes for a specific domain (e.g., petroleum trading and logistics). These attributes provide enhanced navigation of petroleum-based or logistics-based Web sites or other data stores. The petroleum aware search engines can be configured to navigate a specific Web site (e.g., a user's internal Web site) or they can be configured to crawl over a series of external Web sites.

For example, a trader may be "looking for a deal on Brent crude". The domain aware search engine will recognize that this query is a crude oil trade query and associate specific attributes from the search-library knowledge base with it. In this case, the commodity type, location, price and availability dates attributes will be used to search for records, pages or other storage elements that relate to "a deal on Brent crude". Each record, page or other storage element found will display values for commodity type, location, price and availability dates attributes.

Refinery supply planners periodically create refinery supply plans. These plans typically model the supply needs and expected output of a specific refinery for a specific period of time (e.g., monthly). In conventional systems these plans are not adjusted until the next planning period. Using the domain aware search engine of the present invention refinery supply planners can encode searching requirements to uncover economic, logistic or other interesting developments in supply elements (e.g., a price drop in the Brent crude used as input to a refinery) or output elements (e.g., gas price increase 20 cents/gallon). The automated detection of these external changes allows a refinery supply planner to modify his plan on a weekly, daily or almost continuous basis to achieve the highest possible margins for his refinery.

The domain aware search engine can be configured to search various types of data sources, including Web pages and networked databases. In one preferred embodiment the domain aware search engine can search deal negotiation system 37a. Alternate data sources include published market price provides (e.g., Platts, NYMEX), internal customer price/availability forecasts as well as private market maker Web sites (e.g., EnronOnline.com) and public markets (e.g., HoustonStreet.com, RedMeteor.com). The markets providers may or may not be in a partnership relationship with the searcher.

Figure 6C:
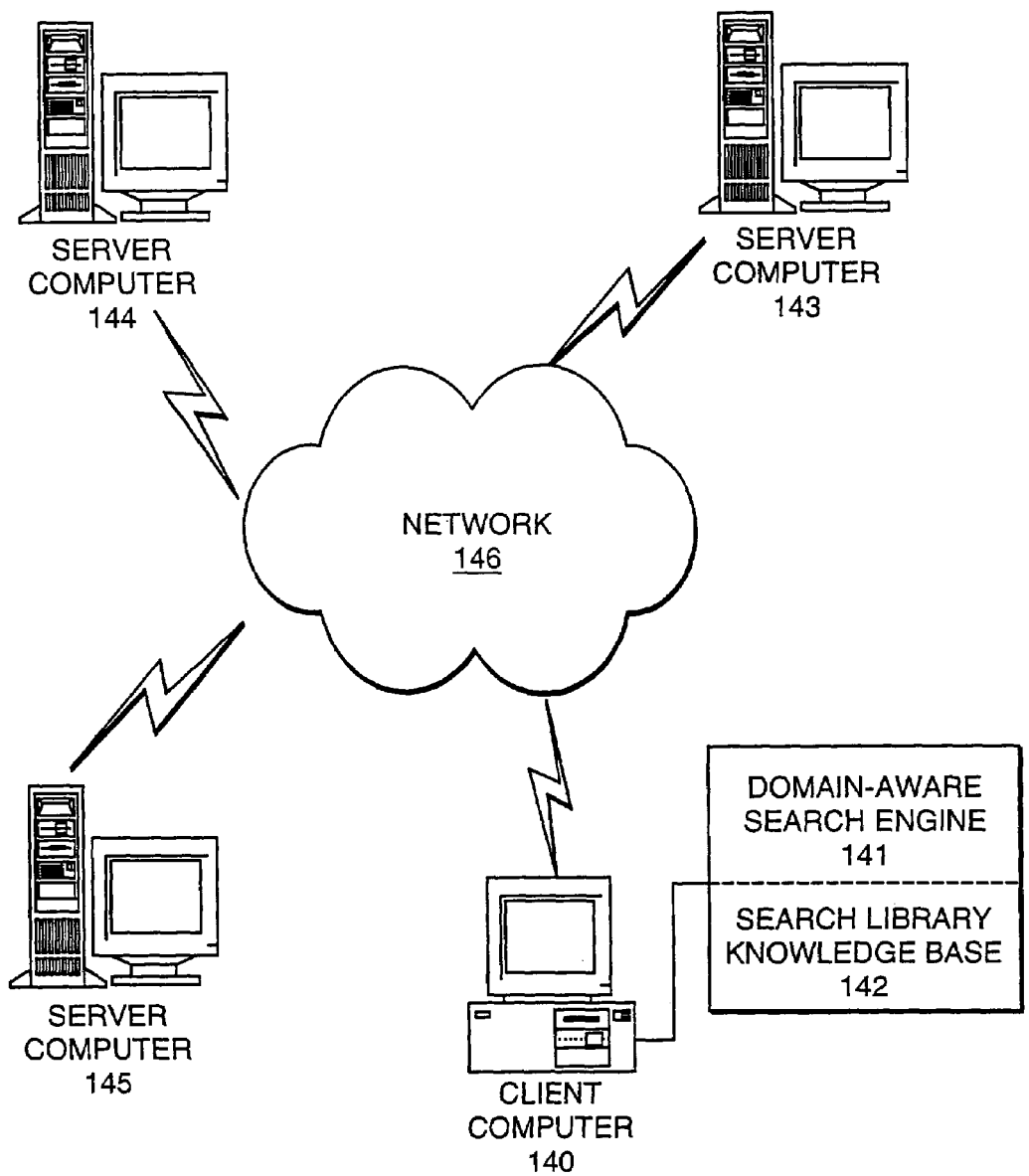
FIG. 6c illustrates a petroleum trading, refining and logistics aware search engine configured according an embodiment of the present invention.

FIG. 6c illustrates a petroleum trading, refining and logistics aware search engine configured according an embodiment of the present invention. A series of server computers 143, 144, 145 are connected to a network 146. Each server computer 143, 144, 145 may contain searchable content. A domain-aware search engine 141 executes on client computer 140 and searches on computers connected to network 146 for content using domain specific knowledge stored in search library knowledge base 142.

Transport selection and optimization tools enable the petroleum trader to screen and select available fleets, vessels, barges and pipeline cycles for the transportation of specific cargos and to evaluate the most economical way to deliver a product to its final destination.

With regard to vessel scheduling application 37b (FIG. 2), bulletin board technology is employed. The vessel scheduling bulletin board enables brokers and vessel owners to post available dates and times for transportation by subject vessel. In a preferred embodiment, the postings are supported by the data stored in vessel objects 81 (FIG. 4b). The vessel name and owner name may initially remain anonymous. A unique identifier (vessel ID) and class (from a predefined class type) sufficiently identify the vessel and capacity. In addition to on-line browsing of the bulletin board of available vessels, scheduling application 37b provides a search function or operation. The search function searches for available vessels given a specified load/quantity, location and delivery dates of a subject petroleum commodity. The user can add specific filtering 'rules' to refine the search to include company specific operating philosophy (e.g., to select only double hulled vessels). For example, the "add to decision support tools" operation 54 downloads quantity, location and delivery date data of a user-selected deal 45 displayed in the deal negotiation system screens 41, 43. Scheduling application 37b uses the downloaded data (e.g., trade object 67) as input to the search function. The search function compares the input quantity to load capacity of various classes of vessels and consequently identifies appropriate vessel classes for the subject deal 45. Based on the identified vessel classes appropriate for the subject deal 45, the search function looks at schedules and waterway restrictions of specific vessels of that identified class. The search function compares the input delivery dates to the schedules of the vessels (FIG. 4b) and determines available suitable vessels. The search function compares the input location to the waterway restrictions 91 of the identified and determined vessels and accordingly filters out the vessels that are restricted from the target (input) load/delivery locations. The remaining date-wise available vessels that meet the delivery port requirements are candidate vessels that the search function recommends on output.

Cost of each of the candidate vessels is calculated based on a completed voyage as determined by related market variables (load port to load port), capacity transported, clean/dirty status and cost rate found in respective vessel objects 81 (FIG. 4b). The search function may also output respective transportation costs of each candidate vessel for the given deal 45.

The deal negotiation system 37a and other decision support tools 39 use the results of the scheduling application 37b search function to generate a delivered commodity price. In particular, for a given trade deal 45, the deal negotiation system 37a sums the commodity price and transportation cost to form the delivered commodity price in arbitrage analyses and various deal negotiation system screen displays 33 (including the main deal negotiation view 41 and subscreen/tab views 43).

Figure 12:
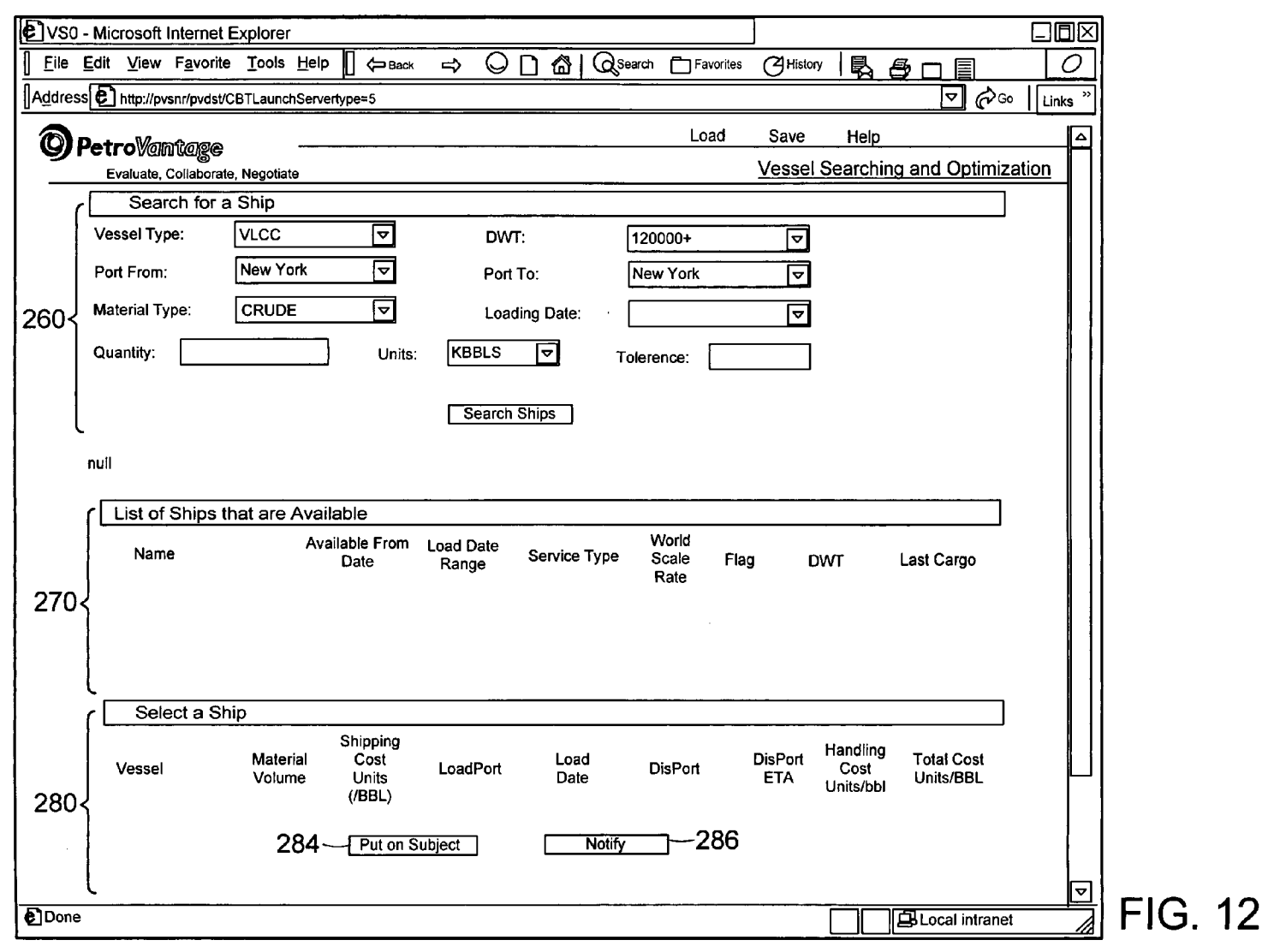

FIG. 12 is an illustration of a graphical user interface for vessel searching and optimization configured according to an embodiment of the present invention. Three panels are displayed. The Search for a Ship panel 260 provides an interface to specify search attributes for use in locating an available ship to carry a cargo. These attributes include: quantity and type of the cargo, port to/from information and various required attributes of the ship. The List of Ships that are Available panel 270 displays a list of ship that are available and meet the requirements of the search attributes defined in the Search for a Ship panel 260. The name of the ship may not be displayed, or may be a pseudo-name, such that the actual name is not revealed until later in the contracting process. The List of Ships that are Available panel 270 display various ship specific attributes, including: World Scale Rate, last cargo and flag, among others. The List of Ships that are Available panel 270 allows a user to select one of the available ships and have it appear in the Select a Ship panel 280. A ship in the Select a Ship panel 280 can be "put on subs" using the Put on Subject button 284. Putting a ship "on subs" effectively holds a ship of a predetermined amount of time without committing to contract for it. The Notify button 286 informs the ship owner of a offer to contract for the ship. The owner's name may not be available to the user at this point.

The vessel scheduling application 37b may be integrated with other decision support tools 39 (e.g., CBAT-G) to provide vessel scheduling support to a petroleum product trade deal 45. FIG. 13a illustrates the CBAT-G tool being used to evaluate (using Evaluate button 296) in stock or on hand components (displayed in the In Stock or On Hand Components panel 294) and components available for trading (displayed in Trade Floor Components panel 292). The blend specification of the desired resultant petroleum product is selected using the Blend Specification panel 290.

FIG. 13b illustrates a graphical user interface for displaying resultant petroleum product blends resulting from a CBAT-G evaluation. Resultant Product Blends panel 300 displays the blend specification and various related attributes, including: volume, cost per barrel and value of the resultant blend. The resultant In Stock or On Hand Components panel 304 now provides a Remove From Available Stock button 308 to affect the allocation of various components to the resultant product blend. The resultant Trade Floor Components panel 302 now provides a Make a Deal button 306. Make a Deal button 306 launches a decision support tool that will provide access to vessel scheduling application 37b such that the user can optimize his selection of vessel used to ship components of the resultant petroleum product blend, or the resultant petroleum product blend itself.

Figure 8:
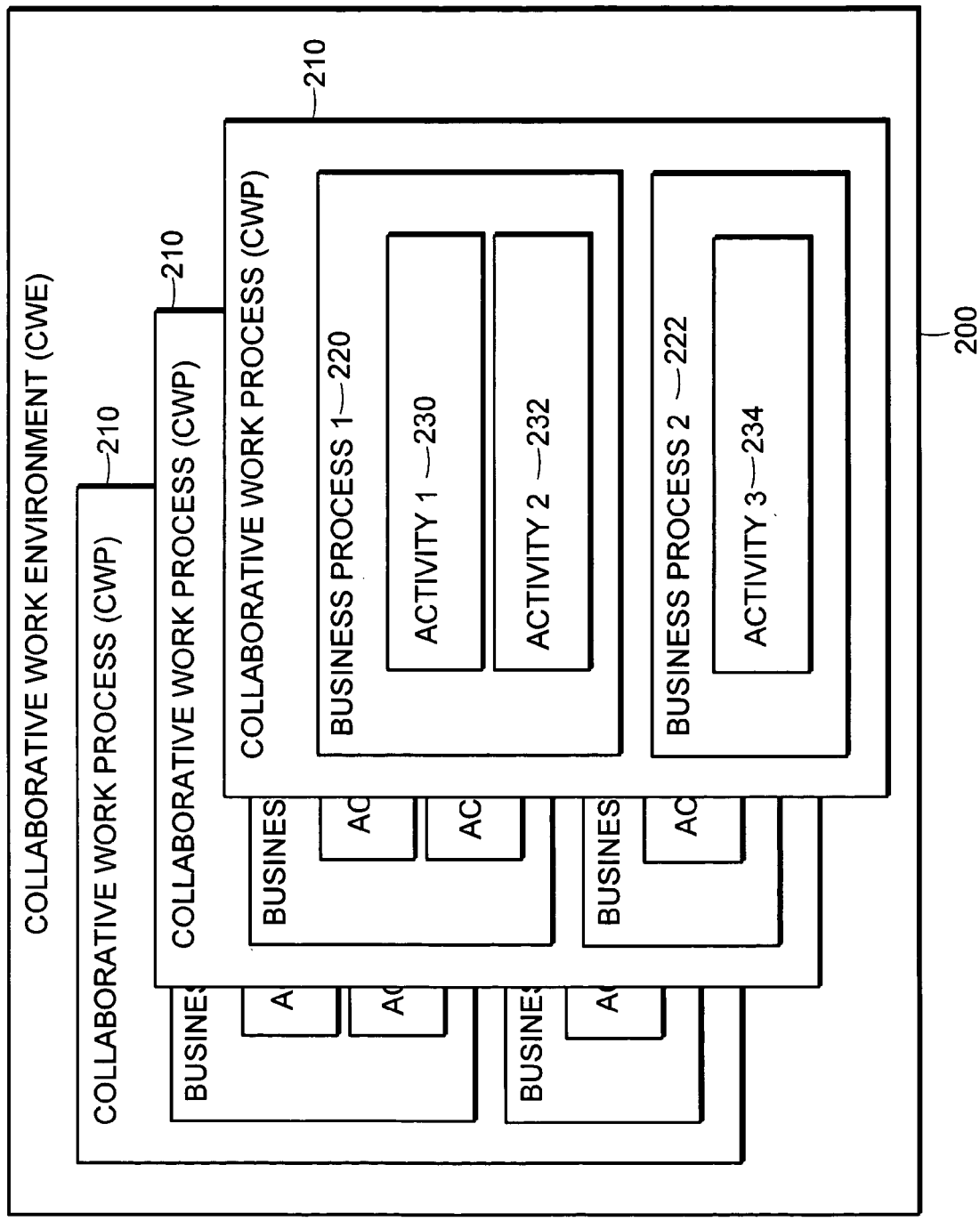
FIG. 8 is a diagram of the hierarchical structure of the collaborative workflow environment configured according an embodiment of the present invention.

A collaborative workflow environment 200 (FIG. 8) configured according to an embodiment of the present invention provides automation for routine business process standardization, reduces error rate and frees users to perform higher-level tasks. One key aspect of the collaborative workflow environment is the ability to communicate and transfer data among users performing roles in a collaborative workflow process. The Collaborative Workflow Environment ("CWE") is an easy to use point and click way to automate work processes and collaborate with partners. It allows for customization of these processes/activities through a 'builder' interface which produces templates matching a business process flow. The templates are applied to the matching business condition/transaction and keeps track of the various activities for a customer. The Collaborative Workflow Process ("CWP") allows for alarms, alerts, data sharing, discussion groups, and integration with internal and external systems reducing the cost of business and maximizing efficiency.) The collaborative workflow environment 200 can integrate with other systems (e.g., via workflow object) to provide integrated collaborative workflow. This enhances the coordination of team activities in both normal and upset situations. The collaborative workflow environment 200 also provides high visibility of end-to-end supply chain points.

The transient nature of many crude oil, intermediate feed stock and crude products deals requires an efficient mechanism for coordinating the many tasks associated with a trade deal 45. Conventional methods of telephone communication and paper task tracking are costly and error prone. A method of providing automated workflow management would reduce the cost and increase the accuracy of conducting crude oil, intermediate feedstock or petroleum product trades.

During the lifecycle of a trade, four types of interactions are typically repeated again and again: (1) iterative work review and approval processes, such as working with the refinery planner and economist to produce the crude oil basket; (2) notifying other participants in planning, trading and logistics processes, such as confirming deals with the refinery scheduler, ship broker, storage and terminal operator and inspection surveying company; (3) tracking, aligning, or transferring work from one person or group to another, such as passing the deal sheet to the accounting and scheduling groups; and (4) transferring and transmitting data among different software systems, such as transferring data to back office and risk management systems.

The present invention collaborative workflow environment 200 allows user to deal rapidly with these activities, dramatically reducing the time and complexity necessary to coordinate the multiple resources required to close deals and arrange associated logistics. It also enables rapid response internally and from business partners to unexpected deviations and opportunities in supply chain logistics, commodity markets, or transportation markets.

In order to help customers establish the collaborative trading and logistics networks that make this goal a reality, the collaborative workflow environment 200 enables: (1) internal processes which are completely secure and internal to a company, such as coordinating trading with supply planning and scheduling; (2) private processes conducted between a company and its closest partners, such as managing long-term crude supply contracts and long-term ship charters; (3) public processes which are conducted in the general marketplace, such as the purchase of a large lot of gasoline or chartering of a vessel for a specific voyage.

In a preferred embodiment, the collaborative workflow environment 200 is delivered via role-based consoles, thereby increasing staff productivity by capturing the relationships between people, organizations, deals, and deadlines; and coordinating and synchronizing the work within and between companies. The collaborative workflow environment 200 can also automatically send notifications, route records for review and completion, and trigger the electronic transfer of pertinent data from the one business system to another (internal or external).

Supporting each console is a respective set of pre-configured collaborative workflow processes 210 (CWPs) which represent common work practices such as: close deal notification, close deal tracking, refinery upset, crude basket, ship late, pre-deal, product long/short, ship charter, inspection nomination and tanker lease inquiry are created as predefined templates. Additionally, client customized workflow processes can be defined. Once implemented, these workflow templates are modifiable to reflect specific needs and implement a company's own best practices.

Supply chain team members around the globe can work together economically in real time using the collaborative workflow environment. Changes in delivery schedules, upsets, or other unforeseen events are quickly broadcast to team members who can make contingency plans. Money and time are leveraged by circulating time-critical information quickly among integrated team members. Important milestones can be focused on without distraction. Ease of use puts all pieces of information at user's fingertips. Messages and alerts are displayed in the message center, flagged by their level of importance. Multiple collaborative work processes 200 (CWPs) can be active at the same time; the CWE console organizes them, sorts them, and flags them to the user. The provided set of templates, designed by leading industry experts, give system analysts a jumpstart on process design. Flexible architecture allows for the design of work processes to suit the company's requirements. Powerful messaging and discussion group features provide for the design of activities that reach out to every supply chain team member simultaneously. Links with the Deal negotiation application 37a provides automated workflows that originate at trade deal 45 closing. Links with the decision support tools 39 allow inclusion of decision support analysis into a workflow. Links provide for launching internal processes that retrieve information to feed back into a workflow.

The collaborative work environment provides 200 a robust infrastructure that allows a user to establish and automate a company's work processes. A work process, known also as collaborative work process 210, or CWP, is an automated and controlled flow of tasks performed by multiple participants. The tasks are linked together into a structured flow of work that can involve as many participants as the user defines and can consist of as many steps as needed. CWE's robust infrastructure allows business process experts and system analysts to design and automate workflows that link together people, deals, and deadlines to accomplish time-critical activities. The CWE 200 infrastructure contains the following key features: set of predefined workflow templates, a flexible architecture, messaging and discussion group features, links with the Deal negotiation application 37a, links with the DSTs 39. In one preferred embodiment these features are represented in a hierarchical structure of CWE 200, CWP 210, business processes 220, 222 and activities 230, 232, 234 (see FIG. 7).

Figure 9:
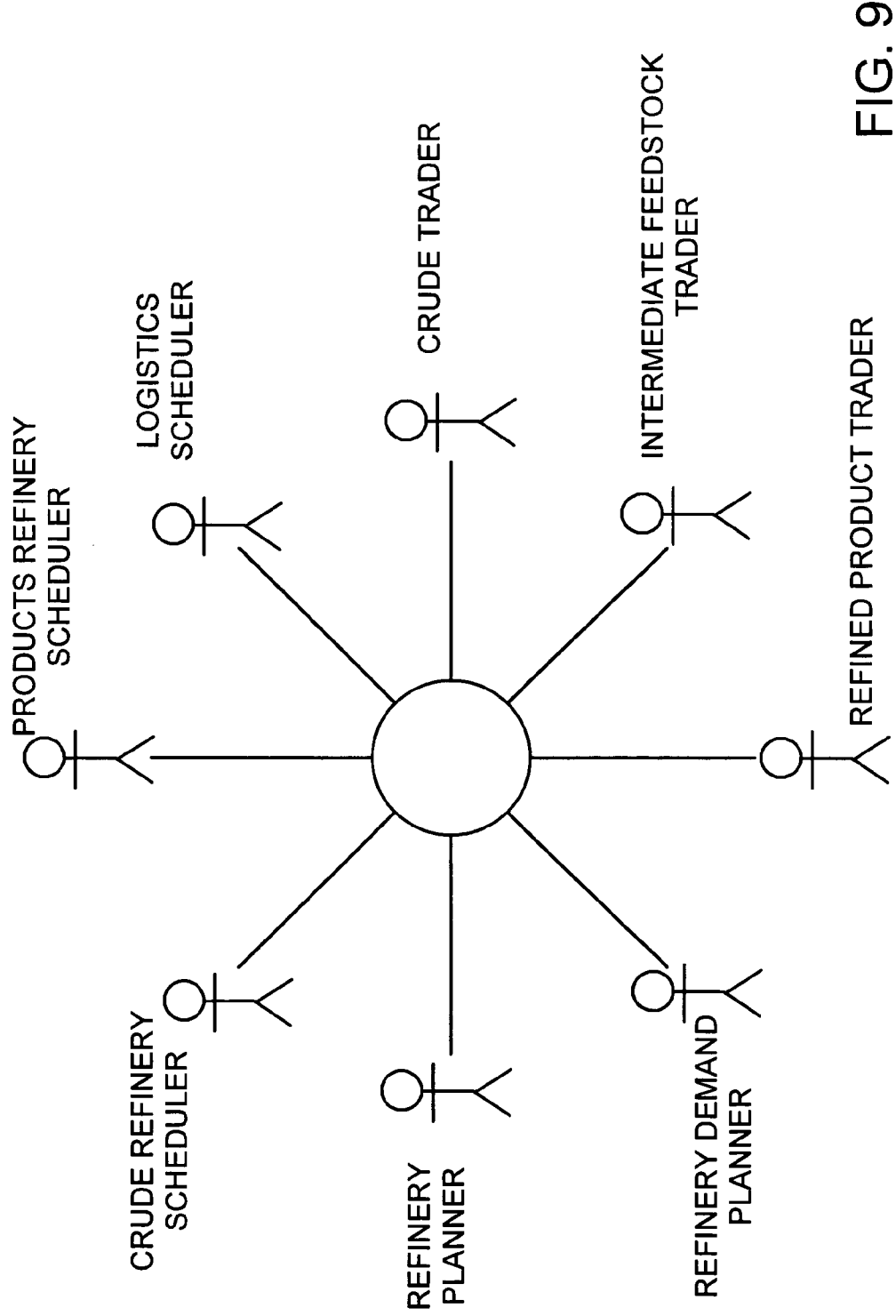
FIG. 9 illustrates the various participants involved in a refinery upset collaborative workflow process configured according an embodiment of the present invention.
Figure 10:
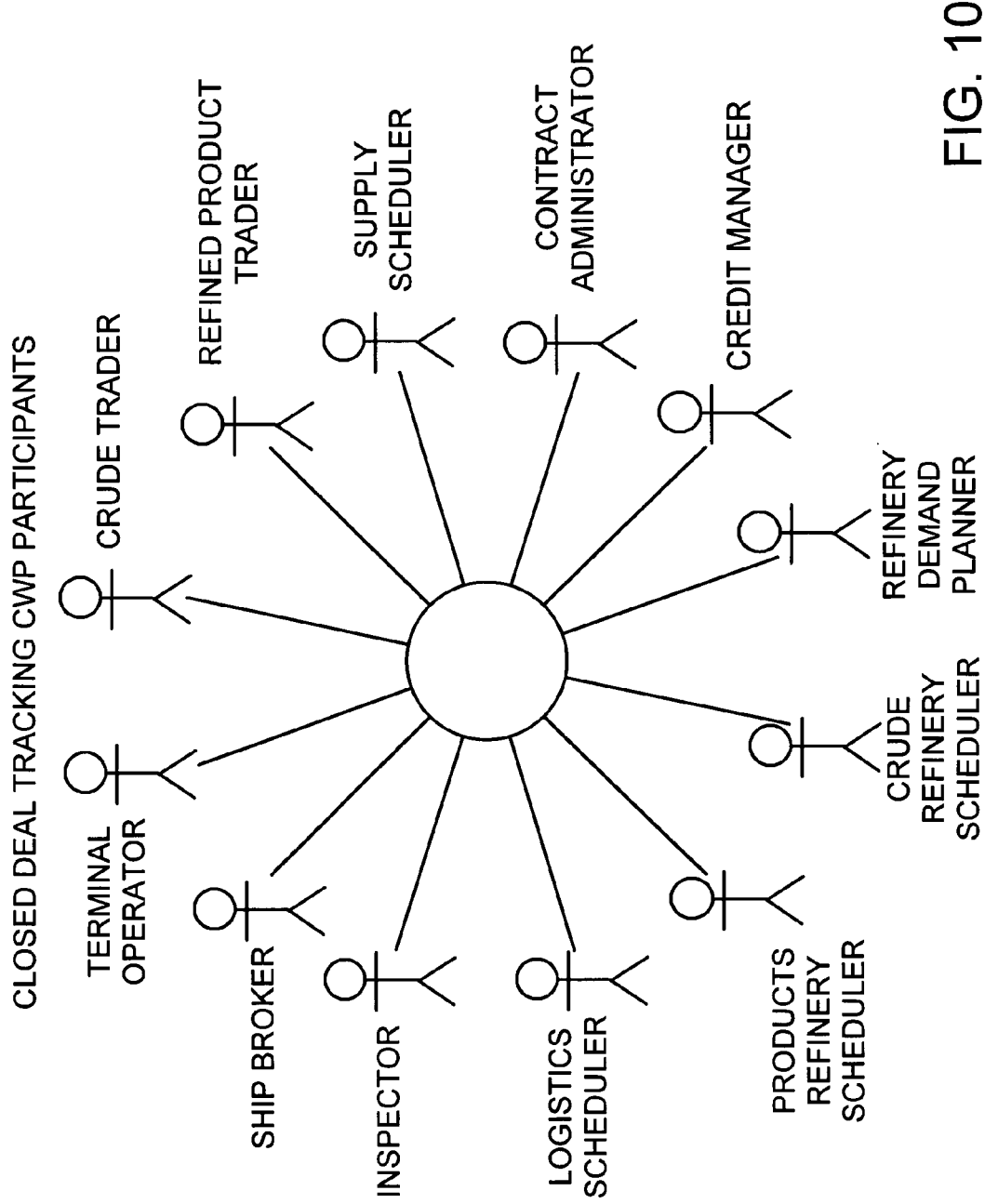
FIG. 10 illustrates the various participants involved in a closed deal tracking collaborative workflow process configured according an embodiment of the present invention.

Each activity that comprises a CWP 210 is performed by the person responsible for its functions. Most activities 230, 232, 234 can have one and only one owner, discussion groups can have multiple owners. Since activities 230, 232, 234 can span all aspects of the industry, CWP 210 participants can be any of the following: contract administrators, credit managers, inspectors, ship brokers, terminal operators, pipeline operators, traders (e.g., crude traders, intermediate feedstock traders and refined product traders), schedulers (e.g., supply schedulers, crude refinery schedulers, products refinery schedulers, logistics schedulers), planners (e.g., refinery planners, refinery demand planners). CWE templates can specify individuals or roles as the initiator and/or responder. The roles will be resolved at run time allowing for easy maintenance as people with an organization changes job responsibilities. Typically, of course, a particular CWP 210 covers a set of work processes involving one segment of work, so its participants are those who perform that segment. For example, a refinery upset CWP would include a different set of participants, or roles (see FIG. 9) than the participants/roles involved in a Closed Deal Notification Message CWP (see FIG. 10).

Depending on a user's role in the organization, and their participation in one or more CWPs 210, a user may work with CWE 200 in one or more ways. A user may be an initiator of an activity, the initiator is the owner of the activity, and therefore responsible for the successful and timely completion of the activity. An initiator will track their own activity, ensure that necessary responses are received, and send out necessary confirmations. An initiator may also track the other activities in their CWP 210.

A respondent to an activity has the role of responding with the correct information within the allotted time-frame. This means that the respondent must keep an eye on the message center to watch for incoming messages. A respondent will also want to monitor the CWP 210 as a whole, to watch its progress and to be aware of any changes or delays.

Managers and other interested parties (i.e., "watchers") will want to maintain an overview of CWPs 210 in progress at their site. They might filter the CWP 210 list to show only overdue CWPs 210, so they know when action might be required.

The CWE 200 has its own console, the CWE view 240, where a user can see a list of active CWPs 210. In addition, CWE 200 uses many other panels to display the full set of features that make up a CWP 200. In one preferred embodiment the CWE view 240 displays all the CWPs 210 in an organization each work process can be expanded to display its sub-processes (e.g., business processes 220, 222) and activities (e.g., activities 230, 232, 234). The message center displays any messages that come to the user as part of a CWP.210. The instant message console displays real-time instant messaging discussions that come to the user as part of a CWP 210. The time-line provides a linear, graphical view of the linked tasks contained in a CWP 210, organized by date. The time-line shows task dependencies at a glance. The spider diagram shows relationships between CWP 210 work and players (persons performing roles).

The CWE view 240 (FIG. 11a) displays the list of work processes in the CWE 200 as configured by the system administrator based upon which CWPs 210 are active at the present time. Each user logged into the CWE 200 can see all the work processes set up for his or her organization, but the list of CWPs 210 viewable may depend on the role associated with the user's login ID. FIG. 11 a shows a list of four active CWPs 210 for a planner. The list of CWPs 210 will change dynamically, throughout the day or even from hour to hour, depending on the CWPs 210 at the site and their status. Once all the activities in a CWP 210 are completed, the CWP 210 is moved to an archive.

List of CWPs 210 can be expanded to show more detail. Clicking on the plus (+) sign next to a CWP 210 in CWE view 240 expands it to display its business processes 220, 222 and activities 230, 232, 234. FIG. 11b shows an expanded Closed Deal Notification CWP. This CWP sends out messages to key players once a deal is closed. Notifications to individuals can be configured in the builder, based on changes, past due status, or other milestones. A business process 220, 222 is illustrated as Notification to Primary Party by System 250. The business process has a beginning and end date. Two activities, Notify Internal Trader Team 252 and Notify Mid-Office System 254 are also illustrated (note: this CWP 210 has many more activities than are shown here). Each activity 230, 232, 234 is associated with an initiator and a respondent, and with beginning and end dates.

FIG. 11c illustrates activity 230, 232, 234 details. Each activity listed in a CWP 210 is underlined, enabling the user to click on it and see its activity details dialog. The Activity Details dialog lists all the information contained in the activity as well as any documents attached by initiators or respondents. Activity data can be updated by users who have edit privileges and a change log will record the updates. Users who has reader access will see these updates when reviewing the activity.

While this invention has been particularly shown and described with references to preferred embodiments thereof, it will be understood by those skilled in the art that various changes in form and details may be made therein without departing from the scope of the invention encompassed by the appended claims.

Trading in petroelum-based products involves crude oil itself as well as many derivative products. For example, intermediate feed stocks are produced from crude oil and refined to produce petroleum products. Any final crude-based produce may be generally referred to as a petroleum product. The present invention considers a trade deal 45 to cover any crude-based product.

A vessel as used in reference to the present invention may be a ship, tanker, truck, airplane, or any other transportation container used to carry cargo.

The computer architecture of host server 27 may be distributed processing, parallel processing and the like. To that end a plurality of networked computers may form host server 27. Certain data structures are disclosed as preferred embodiments, various other data structures besides definition tables 83, 87, 35 and programming objects 67, 81 may be employed.

What is claimed is:

1. In a computer system, providing a non-client computer resident method for optimizing vessel scheduling in a vessel scheduling application program, comprising the steps of:

aggregating vessel information, at least some of the vessel information being automatically downloaded from an electronic source;

storing the aggregated vessel information in a vessel information database comprising vessel information database records;

in response to a certain operation in a deal negotiation application program enabling commodity trading with a third party, downloading information about a potential vessel contracting transaction from a user-selected trade deal in the deal negotiation application program;

searching the vessel information database in a real-time manner to match the potential vessel contracting transaction to at least one of the vessel information database records such that the vessel contracting transaction is optimized; and reporting at least one of the optimized vessel contracting transactions.

2. The method of claim 1 wherein the vessel information comprises at least one of: vessel availability, physical vessel specifications, standard port-to-port pricing, physical port specifications and vessel vetting information.

3. The method of claim 1 wherein factors used to produce the optimized vessel contracting transactions include at least one of: lowest cost and fastest delivery.

4. The method of claim 1 further comprising:
providing fixed route optimization as part of an overall transportation search and optimization system.

5. A computer apparatus providing a non-client computer resident logic unit for optimizing vessel scheduling, comprising:
a vessel information database comprising vessel information database records storing aggregated vessel information, at least some of the vessel information being automatically downloaded from an electronic source;
a receiver, in response to a certain operation in a deal negotiation system enabling commodity trading with a third party, downloading information about a potential vessel contracting transaction from a user-selected trade deal in the deal negotiation system;
a search module searching the vessel information database in a real-time manner to match the potential vessel contracting transaction to at least one of the vessel information database records such that the vessel contracting transaction is optimized; and
a report module reporting at least one of the optimized vessel contracting transactions.

6. The apparatus of claim 5 wherein the aggregated vessel information comprises at least one of: vessel availability, physical vessel specifications, standard port-to-port pricing, physical port specifications and vessel vetting information.

7. The apparatus of claim 5 wherein factors used to produce the optimized vessel contracting transactions include at least one of: lowest cost and fastest delivery.

8. The apparatus of claim 5 further comprising:
providing fixed route optimization as part of an overall transportation search and optimization system.

9. A computer apparatus providing a non-client computer resident logic unit for optimizing vessel scheduling, comprising:
means for aggregating vessel information, at least some of the vessel information being automatically downloaded from an electronic source;
means for storing the aggregated vessel information in a vessel information database comprising vessel information database records;
means for downloading information about a potential vessel contracting transaction from a user-selected trade deal in a deal negotiation system enabling commodity trading with a third party, said means for downloading being responsive to a certain operation in the deal negotiation system;
means for searching the vessel information database in a real-time manner to match the potential vessel contracting transaction to at least one of the vessel information database records such that the vessel contracting transaction is optimized; and
means for reporting at least one of the optimized vessel contracting transactions.

10. A computer program product embodied on a computer readable medium and comprising vessel scheduling and optimization code corresponding to a vessel scheduling application program that, when executed, causes a computer to perform the following:
aggregating vessel information, at least some of the vessel information being automatically downloaded from an electronic source;
storing the aggregated vessel information in a vessel information database comprising vessel information database records;
in response to a certain operation in a deal negotiation application program enabling commodity trading with a third party, downloading information about a potential vessel contracting transaction from a user-selected trade deal in the deal negotiation application program;
searching the vessel information database in a real-time manner to match the potential vessel contracting transaction to at least one of the vessel information database records such that the vessel contracting transaction is optimized; and
reporting at least one of the optimized vessel contracting transactions.

11. The method of claim 1 further comprising the step of providing, in a collaborative workflow application program, automated workflow management for a series of workflow tasks within a collaborative workflow environment.

12. The apparatus of claim 5 further comprising a collaborative workflow system providing automated workflow management for a series of workflow tasks within a collaborative workflow environment.

13. The apparatus of claim 9 further comprising a collaborative workflow system providing automated workflow management for a series of workflow tasks within a collaborative workflow environment.

* * * * *